United States Patent
Hollerbach et al.

(10) Patent No.: US 11,480,544 B2
(45) Date of Patent: Oct. 25, 2022

(54) ATMOSPHERIC PRESSURE ION FOCUSING DEVICE EMPLOYING NONLINEAR DC VOLTAGE SEQUENCES

(71) Applicant: Battelle Memorial Institute, Richland, WA (US)

(72) Inventors: Adam L. Hollerbach, Richland, WA (US); Yehia M. Ibrahim, Richland, WA (US); Sandilya V. B. Garimella, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 232 days.

(21) Appl. No.: 16/783,044

(22) Filed: Feb. 5, 2020

(65) Prior Publication Data
US 2021/0239650 A1   Aug. 5, 2021

(51) Int. Cl.
G01N 27/622 (2021.01)
H01J 49/40 (2006.01)
H01J 49/42 (2006.01)
H01J 49/26 (2006.01)
H01J 49/06 (2006.01)
G01N 27/49 (2006.01)

(52) U.S. Cl.
CPC ........... *G01N 27/622* (2013.01); *G01N 27/49* (2013.01); *H01J 49/065* (2013.01); *H01J 49/26* (2013.01); *H01J 49/401* (2013.01); *H01J 49/4235* (2013.01)

(58) Field of Classification Search
CPC ..... G01N 27/622; G01N 27/49; H01J 49/401; H01J 49/065; H01J 49/26; H01J 49/4235; H01J 49/062
USPC ................................................. 250/281, 282
See application file for complete search history.

(56) References Cited

U.S. PATENT DOCUMENTS

| | | | |
|---|---|---|---|
| 6,639,213 B2 | 10/2003 | Gillig et al. | |
| 2009/0173880 A1* | 7/2009 | Bateman | H01J 49/065 250/292 |
| 2010/0301206 A1* | 12/2010 | Brown | H01J 49/065 250/285 |
| 2011/0062323 A1* | 3/2011 | Brown | H01J 49/28 250/282 |
| 2014/0048695 A1* | 2/2014 | Giles | H01J 49/42 250/281 |
| 2014/0124663 A1* | 5/2014 | Green | H01J 49/42 250/290 |

(Continued)

OTHER PUBLICATIONS

Campbell et al., "Differential mobility spectrometry: a valuable technology for analyzing challenging biological samples," *Bioanalysis* 7(7): 853-856, Apr. 2015.

(Continued)

*Primary Examiner* — Kiet T Nguyen
(74) *Attorney, Agent, or Firm* — Klarquist Sparkman, LLP

(57) ABSTRACT

Apparatus comprise an electrode arrangement comprising a plurality of electrodes defining a volume, an ion entrance, and an ion exit, and a voltage source coupled to the plurality of electrodes and configured to apply a nonlinear DC voltage sequence to the electrodes between the ion entrance and the ion exit that directs ions through the volume with the volume at a pressure of at least 1 Torr. Ions can be focused using nonlinear DC voltage sequences, including at atmospheric pressure. Related methods are also disclosed.

39 Claims, 19 Drawing Sheets

(56) References Cited

U.S. PATENT DOCUMENTS

2017/0345637 A1* 11/2017 Green ............... H01J 49/4225
2019/0057852 A1   2/2019 Ibrahim et al.

OTHER PUBLICATIONS

Fort et al., "The periodic focusing ion funnel: theory, design, and experimental characterization by high-resolution ion mobility-mass spectrometry," *Analytical Chemistry* 85(20): 9543-9548, Oct. 2013.
Kolomiets et al., "Atmospheric pressure ion focusing with a vortex stream," *Talanta* 85(4): 1792-1797, Jul. 2011.
Zhou et al., "Incorporation of a venturi, device in electrospray ionization," *Analytical Chemistry* 75(21): 5978-5983, Sep. 2003.

* cited by examiner

ATMOSPHERIC PRESSURE ION FOCUSING DEVICE EMPLOYING NONLINEAR DC VOLTAGE SEQUENCES

ACKNOWLEDGMENT OF GOVERNMENT SUPPORT

This invention was made with Government Support under Contract DE-AC05-76RL01830 awarded by the U.S. Department of Energy and under grant GM103493 awarded by the NIH National Institute of General Medical Sciences. The Government has certain rights in the invention.

FIELD

The present disclosure relates to apparatus and methods for ion movement and manipulation.

BACKGROUND

Ion mobility and mass spectrometers are widely used in laboratories to radially confine and analyze ions. Spectrometers can be used for the analysis of complex mixtures, biological samples, and explosives, as well as for pharmaceutical and illicit drugs. However, nearly all spectrometers must operate within under very low pressure conditions using elaborate vacuum systems in order to both minimize ionic interactions with background gas molecules and to precisely control ion motion. These vacuum systems are often bulky, expensive, and power-intensive, all of which are significant barriers to successfully commercializing miniature and portable ion mobility and mass spectrometer systems. Thus, there exists a need for ion focusing without the attendant drawbacks of existing systems.

SUMMARY

According to an aspect of the disclosed technology, apparatus include an electrode arrangement comprising a plurality of electrodes defining a volume, an ion entrance, and an ion exit; and a voltage source coupled to the plurality of electrodes and configured to apply a nonlinear DC voltage sequence to the electrodes between the ion entrance and the ion exit that directs ions through the volume with the volume at a pressure of at least 1 Torr. In further examples, the volume is at a pressure of at least 50 Torr. Representative examples can have the pressure of the volume at or near an atmospheric pressure.

In some examples, the nonlinear DC voltage sequence is configured to focus the ions at the ion exit. In further examples, the nonlinear DC voltage sequence is defined by a voltage difference between adjacent electrodes that increases nonlinearly from the ion entrance to the ion exit. In some examples, at least a portion of the nonlinear DC voltage sequence includes a quadratic DC voltage sequence. In other examples, at least a portion of the nonlinear DC voltage sequence includes an exponential DC voltage sequence. In further examples, the nonlinear DC voltage sequence includes a quadratic DC voltage sequence along a first length and an exponential DC voltage sequence along a second length adjacent to the first length.

In some examples, the apparatus can include an ion receiver coupled to the ion exit. In further examples, the ion receiver is an ion analyzer or is coupled to an ion analyzer. In other examples, the ion receiver is a collection plate, an ion mobility spectrometer, or a mass spectrometer. In some examples, the apparatus can include an ion source coupled to the ion entrance. In further examples, the ion source is an electrospray ionization source, a plasma ionization source, an atmospheric pressure chemical ionization source, an atmospheric pressure photoionization source, electron impact ionization source, or a combination thereof.

In some examples, apparatus can include a housing supporting the electrode arrangement, wherein the housing includes a gas port configured to receive a drift gas source and a heat source configured to heat the electrode arrangement and the volume. In further examples, the plurality of electrodes are circular electrodes and the electrodes are evenly spaced along, and concentrically arranged about, a common axis. In other examples, the common axis is bent or curved. In other examples, the electrodes have a non-circular cross section.

According to a further aspect of the disclosed technology, methods include applying a nonlinear DC voltage sequence to a plurality of electrodes of an electrode arrangement, wherein the plurality of electrodes define a volume, ion entrance, and ion exit, and wherein the application of the nonlinear DC voltage sequence is configured to direct ions through the volume between the ion entrance and ion exit with the volume at a pressure of at least 1 Torr. In further examples, the volume is at a pressure of at least 50 Torr. In selected examples, the volume is at a pressure of at or near atmospheric pressure.

In some examples, methods include introducing the ions into the volume through the ion entrance. In further examples, methods include focusing the ions at the ion exit using the applied nonlinear DC voltage sequence. In other examples, the pressure is at least atmospheric pressure. In further examples, the methods include directing ions focused at the ion exit to a focused ion beam target.

In some examples, the nonlinear DC voltage sequence is defined by a voltage difference between adjacent electrodes that increases nonlinearly from the ion entrance to the ion exit. In further examples, the nonlinear DC voltage sequence comprises a first portion defining a quadratic DC voltage sequence and a second portion defining an exponential voltage sequence. In some examples, methods include receiving ions at the ion exit by an ion receiver. In further examples, methods include directing the received ions to an ion analyzer, wherein the ion analyzer is a mass spectrometer or an ion mobility spectrometer.

In some examples, the nonlinear DC voltage sequence comprises a quadratic sequence, an exponential sequence, a cubic sequence, and/or a complex wave function sequence. In other examples, methods include varying the nonlinear DC voltage sequence over time with ions in the volume. In further examples, methods include injecting a drift gas into the volume with the ions in the volume. In some examples, methods include applying heat to the electrode arrangement and/or the volume. In further examples, methods include introducing a drift gas to the volume. In other examples, methods include receiving ions at an ion exit of the electrode arrangement.

The foregoing and other objects, features, and advantages of the disclosed technology will become more apparent from the following detailed description, which proceeds with reference to the accompanying figures.

BRIEF DESCRIPTION OF THE DRAWINGS

FIG. 1 is a set of plots of spot diameters for the ion trajectories in FIG. 9.

DETAILED DESCRIPTION

Figure 1:
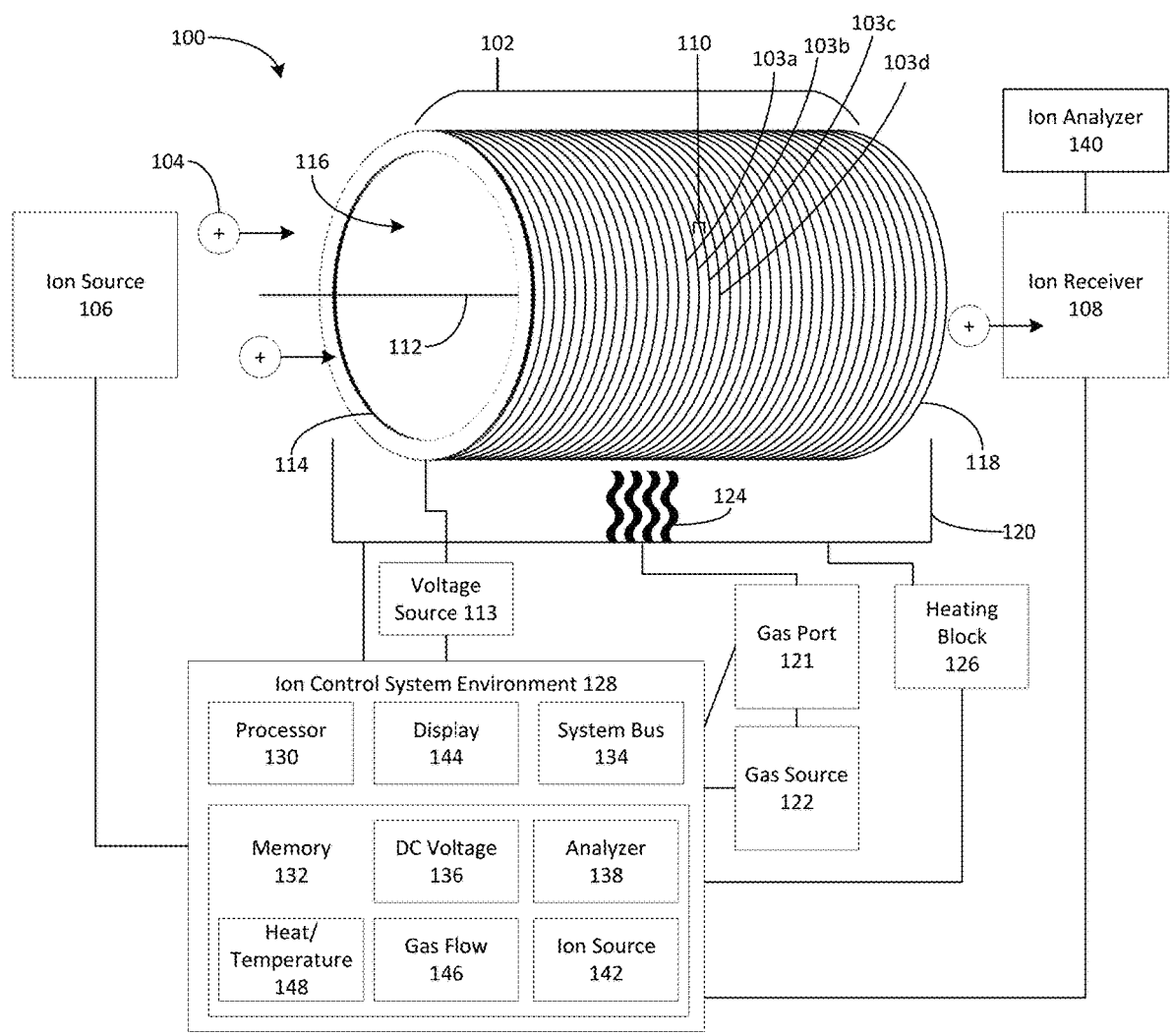
FIG. 1 is a schematic of anion focusing system.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present, or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses the terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many used functional alternatives can be made, and such selections need not be better, smaller, or otherwise preferable to other selections.

Some examples are described in relation to one or more longitudinal and lateral directions generalized to correspond to ion movement or confinement. Directions typically apply to ion movement, trapping, and confinement and are provided by electric fields produced by one or more electrodes that are arranged to define one or more volumes or channels of various shapes, sizes, and configurations. A direction can correspond to a single path, multiple paths, bi-directional movement, inward movement, outward movement, or a range of movements. Actual ion movement paths vary and can depend on the various characteristics of the electrode and the positional, polarity, kinetic, or other characteristics of the ions received in a confinement volume. Directions referred to herein are generalized and actual specific particle movements typically correspond to electric fields produced and the electrical mobilities of the ions propagating in relation to the electric fields.

Transitioning the analysis of ions from a vacuum to atmospheric pressure conditions is a considerable challenge in analytical chemistry. Primarily, the analysis of ions is typically performed within a vacuum because few ways to effectively focus ions at elevated pressures exist. For instance, in order to radially confine ions, most conventional ion mobility and mass spectrometers use high voltage radiofrequencies (RF) (e.g., electrodes possessing 180-degree phase-shifted RF waveforms) at vacuum pressures of 10 Torr or less. While these processes that utilize RF voltages at lower pressures can radially confine ions and prevent their diffusion toward discharging surfaces, these processes are highly ineffective at higher pressures (e.g., greater than or equal to 1 Torr) and/or under low electric field strength, drift gas density ratios (e.g., low E/N conditions). Any attempt of using these systems and/or methods at atmospheric pressure results in improper function and/or significant ion losses.

Alternatively, the present disclosure utilizes spatially, nonlinearly distributed direct current (DC) voltages to provide radially inward confinement (i.e., spatial ion focusing) of ions at atmospheric pressure (e.g., approximately 760 Torr). The use of such spatial ion focusing can, among other things, increase signal intensity, provide an effective ion source interface for spectrometer devices (e.g., ion mobility spectrometry), and/or produce a suitable ion source for atmospheric pressure ion manipulation in surface functionalization and soft-landing processes (e.g., the deposition of ions on a particular surface).

As described herein, the present disclosure is directed to systems and methods of manipulating ions, including the use of a nonlinear sequences to form a voltage gradient to direct ions linearly along a longitudinal path of electrode arrangement. In some examples, ion focusing (i.e., confinement) is provided by electric fields formed by a nonlinear DC voltage gradient applied to the system. In representative examples, ion focusing is provided by a nonlinear DC gradient that can include one or more nonlinear mathematical functions to achieve radial ion focusing under atmospheric pressure with minimal to no loss of ions. In some examples, the ions are manipulated under atmospheric conditions for delivery to an ion analytical device, for example, a mass spectrometer, an ion mobility spectrometer, inlet capillaries, an optical device, and/or any other analytical devices, including those already operating under atmospheric conditions. In some examples, an ion source including an electrospray ionization source, a plasma ionization source, an atmospheric pressure chemical ionization source, an atmospheric pressure photoionization source, and/or corona discharge ionization source can deliver ions into the system.

The systems and methods of the present disclosure successfully achieve ion focusing at atmospheric pressure and/or other elevated pressures (e.g., pressures greater than 1 Torr, 50 Torr, 100 Torr, 500 Torr, atmospheric, above atmospheric, etc.) by applying a nonlinear sequence of DC voltages to an electrode arrangement, for example, to a conventional stacked ring focusing device. The radial confinement at atmospheric pressure is achieved by the nonlinear DC voltage gradient created by the nonlinear sequences which produce an electric filed gradient that changes as a function of distance. As a result, rather than being time dependent, such as a RF system which establishes a pseudopotential well in the time domain, a nonlinear DC voltage gradient establishes a pseudopotential well in the space domain, allowing for significant spatial ion focusing at atmospheric pressure without any need for operating in a vacuum. This ability to focus ions at atmospheric pressure, for example, can improve the transmission of ions to atmospheric pressure interfaces between ion sources and mass spectrometers. Additionally, spatial ion focusing can produce tightly collimated ion beams for interfacing with ion manipulation devices operating under atmospheric pressure conditions.

To successfully focus ions at atmospheric pressure, the present disclosure utilizes exponential, quadratic, cubic, and/or other nonlinear mathematical sequences to create a voltage gradient along an electrode arrangement. By using a nonlinear sequence, such as an exponential and/or quadratic sequence, voltage differences between adjacent electrodes form an electric field gradient which is constantly changing along the length of an electrode arrangement to direct ions introduced into the system linearly through the electrodes. For example, as described herein, an exponential sequence applied to an electrode arrangement forms relatively low voltage differences between adjacent electrodes at the beginning of the system; whereas, the voltage differences further along and toward the end of the system become increasingly greater causing the ions to intensely focus.

FIG. 1 shows an example ion focusing system 100 that can be used to achieve ion focusing at pressures above very low-pressure conditions, including at atmospheric pressure. The ion focusing system 100 can include an electrode arrangement 102 (e.g., such as a drift tube) that is situated to collect ions 104 from an ion source 106 and to direct the ions 104 to an ion receiver 108. In representative examples, the electrode arrangement 102 includes a plurality of electrodes, e.g., electrodes 103a-103d, each being adjacently spaced from each other by a distance 110 along a longitudinal axis 112. A voltage source 113 is coupled to the electrode arrangement 102 and configured to apply different voltages to different individual electrodes or groups of electrodes of the electrode arrangement 102 (e.g., through wiring or traces of a printed wiring board). In representative examples, the spatial arrangement of the electrodes and the voltage applied to the electrodes is selected to define a non-linear voltage gradient along the longitudinal axis 112 that moves the ions 104 through a volume 116 defined by the electrode arrangement 102, from an ion entrance 114 and to an ion exit 118.

The ion focusing system 100 typically includes a housing 120 which can house and/or support the electrode arrangement 102 and other components, such as the ion source 106 and ion receiver 108. In some examples, fittings (not shown) can be used to removably couple the ion source 106 to the ion entrance 114 and/or removably couple the ion receiver 108 to the ion exit 118. In some examples, the housing 106 can also house and/or support other system components, such as a gas port 121 that can be coupled to a gas source 122. The gas source 122 can supply one or more gases 124 (e.g., a drift gas) that can be introduced to the volume 116 through the gas port 121. In some examples, the housing can also house a heating block 126 configured to apply heat to the plurality of electrodes of the electrode arrangement 102, volume 116, or other components of the ion focusing system 100, as for example, to improve desolvation of the ions 104 that move through the ion focusing system 100.

In examples, the ion focusing system 100 can include an ion control system environment 128 in communication with the electrode arrangement 102, ion source 106, ion receiver 108, voltage source 113, gas source 122, housing 120, and/or the heating 126, and that is operable to control collection and/or manipulation of the ions 104. The ion control system environment 128 can include one or more computing devices and/or controllers that include at least a processor 130 and a memory 132. Computing devices can include desktop or laptop computers, mobile devices, tablets, industrial control systems, programmable logic controllers (PLCs), systems-on-a-chip, etc. The processor 130 can include one or more CPUs, GPUs, ASICs, FPGAs, MCUs, PLDs, CPLDs, etc., that can perform various data processing or I/O functions associated with the ion focusing system 100. The memory 132 can be volatile or non-volatile (e.g., RAM, ROM, flash, hard drive, optical disk, etc.) and fixed or removable and is coupled to the processor 130. The memory 132 can provide storage for various processor-executable logic instructions and program modules which when executed by the processor 130, cause the ion focusing system 100 to generate, move, focus, and/or manipulate the ions 104. Storage can also be provided with one or more other computer-readable media. One or more system buses 134 can provide a communication path between various environment components, such as between processor and I/O communication modules. The ion control system environment 128 can also be situated in a distributed form so that applications and tasks are performed by remote processing devices that are linked through a communications network. In a distributed computing environment, program modules and logic can be located in both local and remote memory storage devices. For example, the ion receiver 108 can be an ion analyzer or coupled to an ion analyzer 140 which can send control signals to the ion control system environment 128 or can correspond to the ion control system environment 128. In some examples, various components can be combined, such as by having the voltage source 113 include the processor 130 and memory 132.

In representative examples, the memory 132 includes DC voltage control logic 136 that controls the electric potential applied to the electrode arrangement 102 such that the ions are directed through the volume 116 of the electrode arrangement 102. The DC voltage control logic 136 can apply a specified single sequence or multiple sequences such that a nonlinear DC voltage gradient can include one or more sequences along different portions of the electrode arrangement 102, or such that a DC voltage gradient varies over time, e.g., between different types of nonlinear DC voltage gradients, linear to nonlinear, nonlinear to linear, etc. In some examples, gradient profile, selection, and/or variation can be applied based on feedback from one or more system components, such as thermal feedback, ion analyzer or ion source gating, pulsing, packet formation or sensing, or other signaling, etc. In additional examples, gradient profile, selection, and/or variation can be applied based on other characteristics, such as predetermined user selection, ion species characteristics, ion exit aperture, etc.

In further examples, the memory 132 can include ion analyzer logic 138 to detect and/or receive parameters from the ion analyzer 140 coupled to the ion receiver 108. In some examples, the ion analyzer 140 can be configured to apply (or to communicate with the computing device so that the DC voltage control logic 136 applies) a particular nonlinear DC voltage sequence and/or series of sequences to the electrode arrangement 102 in accordance with a specified analytical process and/or processes (e.g., a nonlinear DC voltage gradient for time-of-flight measurement of a particular ion sample). In additional examples, the memory 132 can include ion source logic 142 that controls generation and/or emission of ions from the ion source 106. The ion source logic 142 can also be synchronized to the DC voltage control logic 136 to queue or position the ions 104 in the ion focusing system 100 so that groups of the ions 104 can be controllably released or directed into the volume 116 through the ion entrance 114. In some examples, the memory 132 includes gas control logic 146 which can be in communication with one or more gas control valves of the gas source 122 and/or gas port 121 in order to introduce the gas 124 into the ion focusing system 100. In further examples, the memory 132 can include heat control logic 148 in communication with the heating block 126 to control a temperature of the volume 116, the electrode arrangement 102, the gases 124, or other components of the ion focusing system 100. In further examples, DC voltages, ion characteristics, and/or other system parameters or performance outputs can be displayed on a display 144 and can be controlled by one or more input/output devices and/or operator (e.g., with a keyboard, mouse, or other interactive device, including the display 144). In other examples, the DC voltage control logic 136, ion source logic 142, analyzer logic 138, and/or gas control logic 146 can all be accessed and manipulated through user control by way of the display 144.

In different examples, the electrode size and spacing of the electrode arrangement 102 can be varied based on electric field requirements for different ions (e.g., with different m/z ratios), coupled efficiencies, and input parameters for an ion analyzer 140 (e.g., timing, density, particle energy). Electrode spacing typically provides a minimum non-conductive area between electrodes to reduce the probability of electrical shorts or interference. In typical examples, the spacing 110 can correspond to a minimum spacing and electrode size that is on the order of millimeters, including as low as approximately 0.5 mm, though other dimensions are possible. Also, circular and/or other geometric shapes can simplify construction and can define system features or boundaries (e.g., apertures).

Figure 2A:
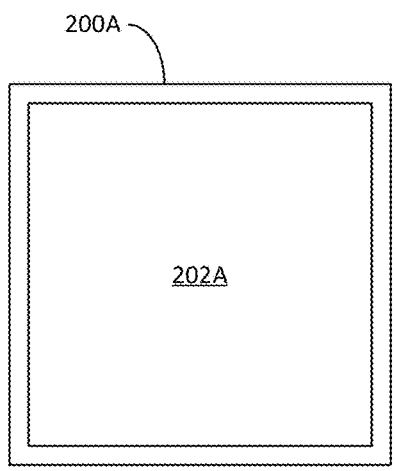
FIGS. 2A-2E are cross-sectional end views of electrodes of different electrode arrangements.
Figure 2B:
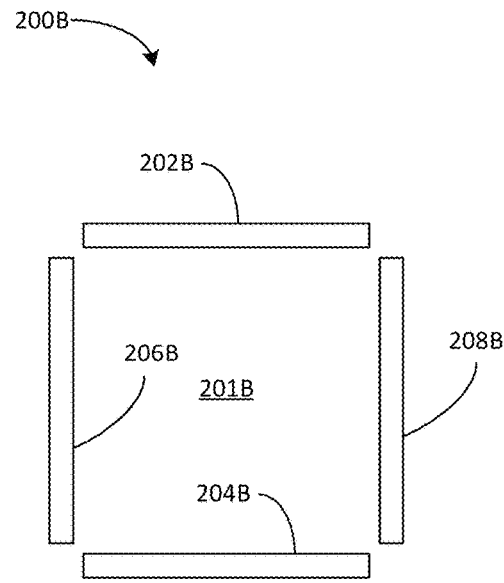
Figure 2C:
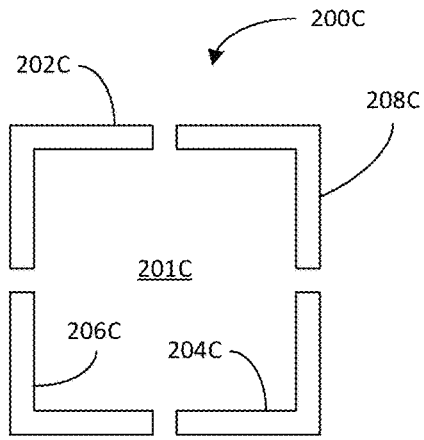
Figure 2D:
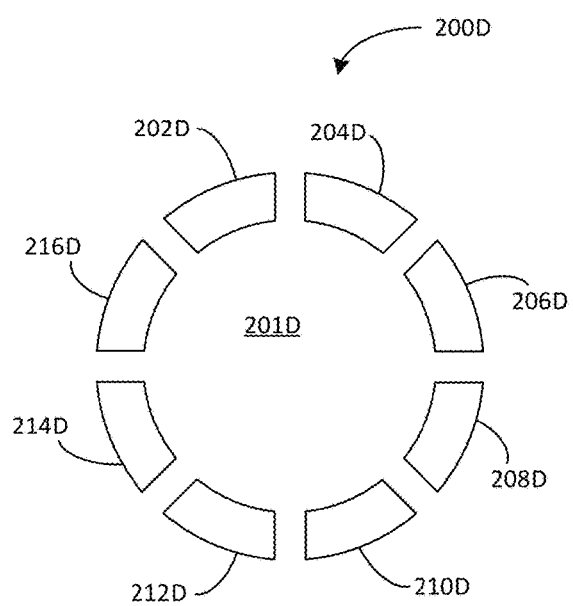
Figure 2E:
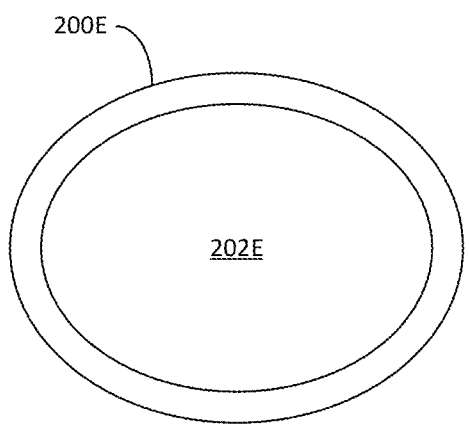

As shown in FIG. 1, the electrodes of the electrode arrangement 102 have a circular shape of constant diameter and the longitudinal axis 112 is straight, defining a cylindrical shape for the volume 116. In additional examples, individual electrodes and/or electrode arrangements of ion focusing systems can have different geometries and/or different configurations. For example, FIG. 2A shows an example electrode 200A having a square shape so as to define a planar square-shaped cross-section of an associated electrode arrangement volume 202A. Non-square shaped cross-sections can be defined as well, e.g., with electrode 200A extending with a rectangular shape. FIG. 2B shows an example electrode set 200B defining a cross-section of an electrode arrangement volume 201B. The electrode set 200B includes four electrodes 202B-208B, with electrodes 202B, 204B situated parallel and opposed to each other and with electrodes 206B, 208B also situated parallel and opposed to each other but perpendicular to the electrodes 202B, 204B. In some examples, one set of parallel electrodes, e.g., electrodes 202B, 204B, can be configured to receive voltages defining a non-linear voltage gradient into or out of the plane of FIG. 2B, and the other set of parallel electrodes 206B, 208B can be configured as guard electrodes, e.g., with a static DC voltage. Guard electrodes can be situated to prevent ions from leaving the electrode arrangement volume 201B. Guard electrodes can also extend into or out of the plane of FIG. 2B, e.g., a substantial portion or an entire length of the electrode arrangement volume 201B. In some examples, each of the electrodes 202B-208B can have a common voltage. In additional examples, one or more of the electrodes 202B-208B can have other electrical potentials applied that are different from guard voltages or non-linear gradient voltages. FIG. 2C shows a square-shaped set of electrodes 200C defining a cross-section of an electrode arrangement volume 201C. The set of electrodes 200C includes four 'L' shaped electrodes 202C-208C, though more or fewer electrodes are possible. FIG. 2D shows a circular set of electrodes 200D defining a cross-section of an electrode arrangement volume 201D. The set of electrodes 200D includes curved electrodes 202D-216D, which can be arranged symmetrically as shown or non-symmetrically (e.g., with an odd number of electrodes). In some examples, selected ones, sets, or all of the electrodes 202D-216D are configured to provide a non-linear voltage gradient in the electrode arrangement volume 201D. Selected sets can include one or more adjacent and/or opposing pairs of electrodes, by way of example. FIG. 2E shows an example electrode 200E having an elliptical shape defining an elliptical cross-section of an electrode arrangement volume 202E.

Figure 2F:
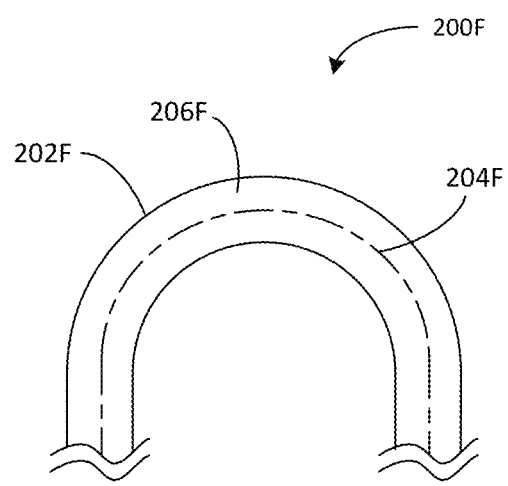
FIG. 2F is atop view of an electrode arrangement.

FIG. 2F shows an example of an electrode arrangement 200F having a plurality of electrodes 202F arranged along a longitudinal axis 204F so as to define a curved electrode arrangement volume 206F. Thus, in various examples, electrode arrangements can define bent, folded, or other non-straight configurations along which electrodes are arranged and configured to direct ions. For example, in order to avoid problems associated with neutral transmission (e.g., ghost peaks, peak broadening, inability to focus neutral species), the curved path configuration shown in FIG. 2F can allow ions of interest to be transmitted along the longitudinal axis 204F as the ions are directed 180-degrees (or another angle) from an initial direction of travel.

Figure 3:
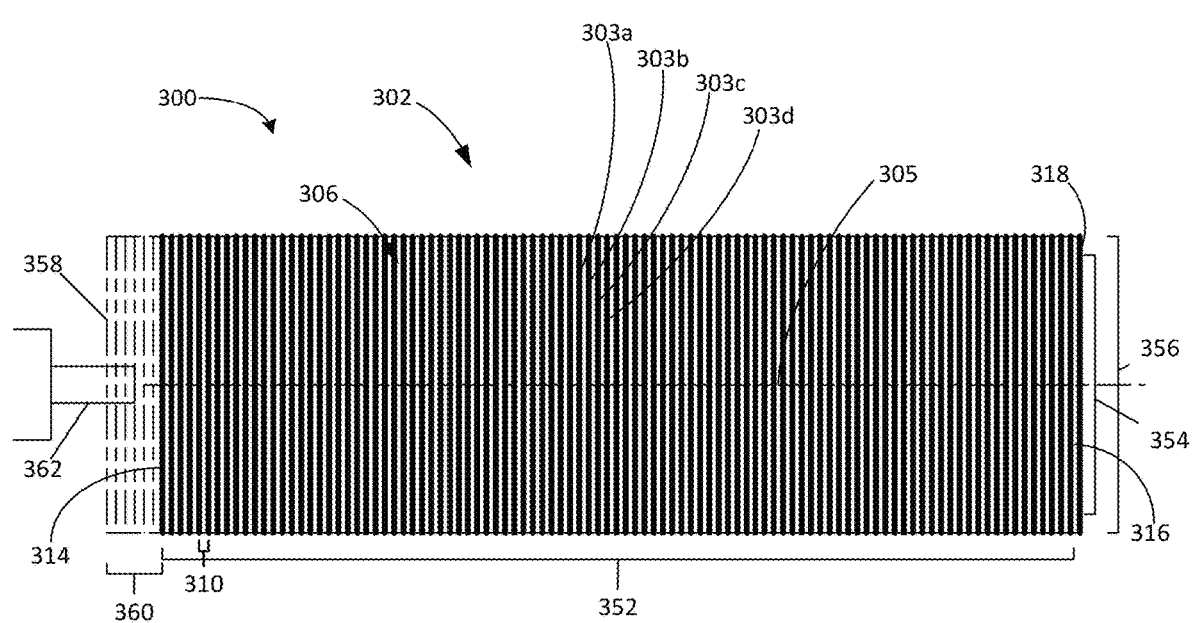
FIG. 3 shows aside view of anion focusing electrode arrangement and related components.

FIGS. 3-12 show how a nonlinear DC voltage gradient can be used to avoid using RF electrode confinement and overcome extensive vacuum requirements. For example, FIG. 3 shows the profile of an ion focusing device 300 having an electrode arrangement 302 with one hundred electrodes in a drift tube configuration having a total length 352 (e.g., 100 mm). In some examples, the ion focusing device 300 can be similar to components of the ion focusing system 100. As shown, each of the individual electrodes of the electrode arrangement 302 (e.g., with electrodes 303a-303d forming a small subset) can be equally spaced by a distance 310 or pitch (e.g., of 0.5 mm) along a longitudinal axis 305. The electrodes can have a circular shape defining an inner diameter 354 (e.g., of 50 mm) and corresponding tubular volume 306 for an interior of the ion focusing device 300. The electrodes can also have an outer diameter 356 (e.g., of 55 mm), and a width (e.g., of 0.5 mm). A focusing electrode 358 (e.g. with a length 360 extending in the direction of the longitudinal axis 305 (e.g., of about 6 mm) can be situated at an ion entrance 314 of the electrode arrangement 302 and volume 306. The focusing electrode 358 can also surround an ion source 362 (e.g., an ESI emitter) and provide an initial, relatively large, voltage. The higher voltage can be configured to provide a voltage gradient to assist with ions entering the volume 306 and to reduce radial dispersion of ions emitted into the volume 306. In some examples, the voltage applied to the focusing electrode 358 is significantly higher than a voltage applied to a first electrode at the ion entrance 314 of the electrode arrangement 302. The focusing electrode 358 can be a single electrode or multiple electrodes, with multiple electrodes held at a common potential or at different potentials (e.g., a gradient). During operation the electrodes arrangement 302 directs received ions from the ion entrance 314 through the volume 306 to an ion exit 316.

During vacuum based ion spectrometer processes (e.g., less than about 50 Torr, 20 Torr, 10 Torr, 5 Torr, 1 Torr, etc.), a linear voltage sequence can be applied to the system of electrodes (e.g., 1000, 900, 800, 700, 600, etc.). However, in various examples herein, ion focusing is obtained at elevated pressures, such as greater than 1 Torr, 50 Torr, 100 Torr, 500 Torr, 760 Torr (atmospheric), or higher, by applying nonlinear DC voltage sequences to the electrodes of the electrode arrangement 302. For example, rather than providing a linear voltage sequence with respect to distance, such as 1000, 900, 800, 700, 600, etc., and spatial positions 0, 1, 2, 3, 4 (arb. units), nonlinear voltage sequences are provided, such as 1000, 900, 790, 670, 540, etc., at the same spatial positions 0-4.

Figure 4:
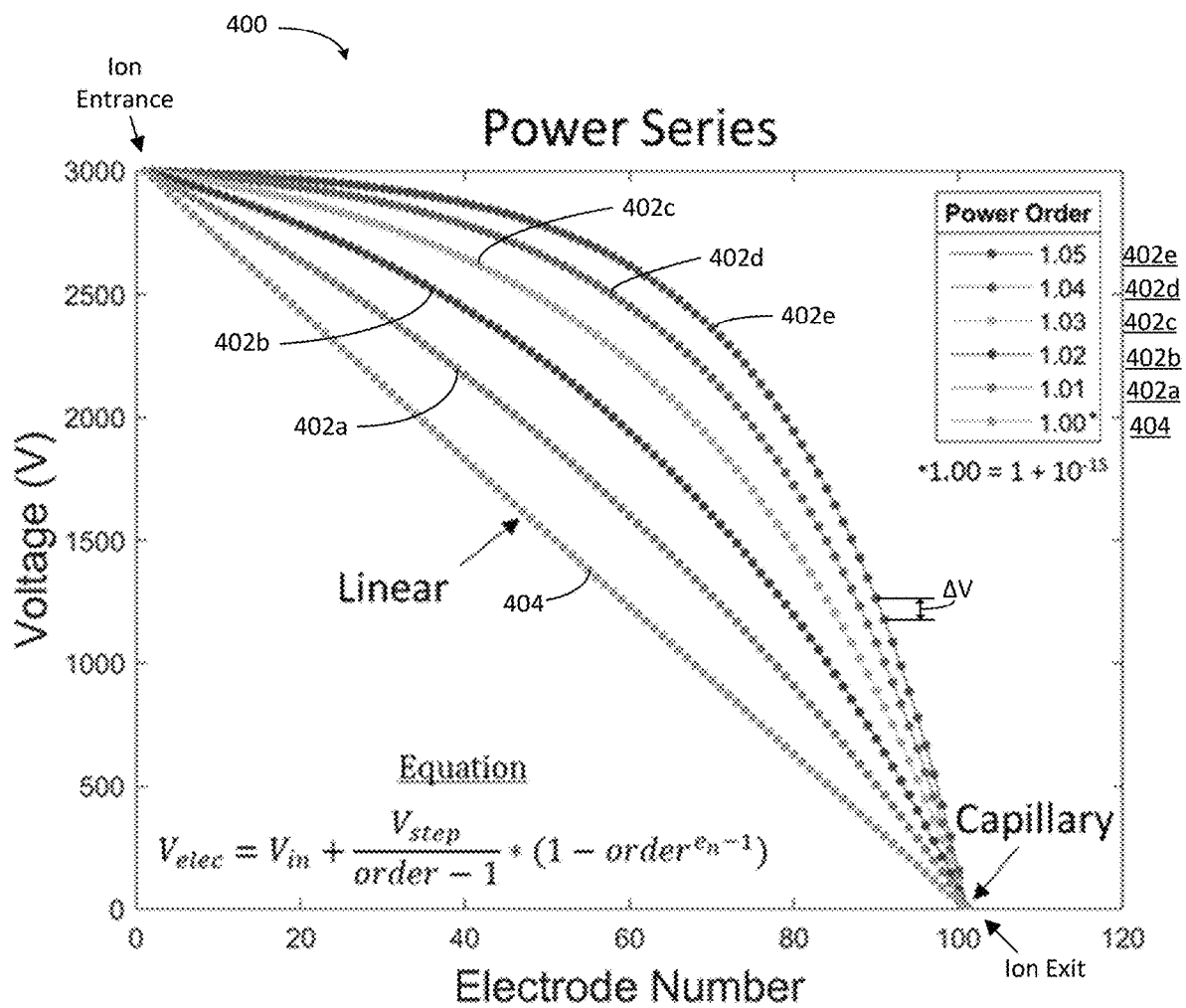
FIGS. 4-5 are graphs of power and quadratic nonlinear voltage sequences.
Figure 5:
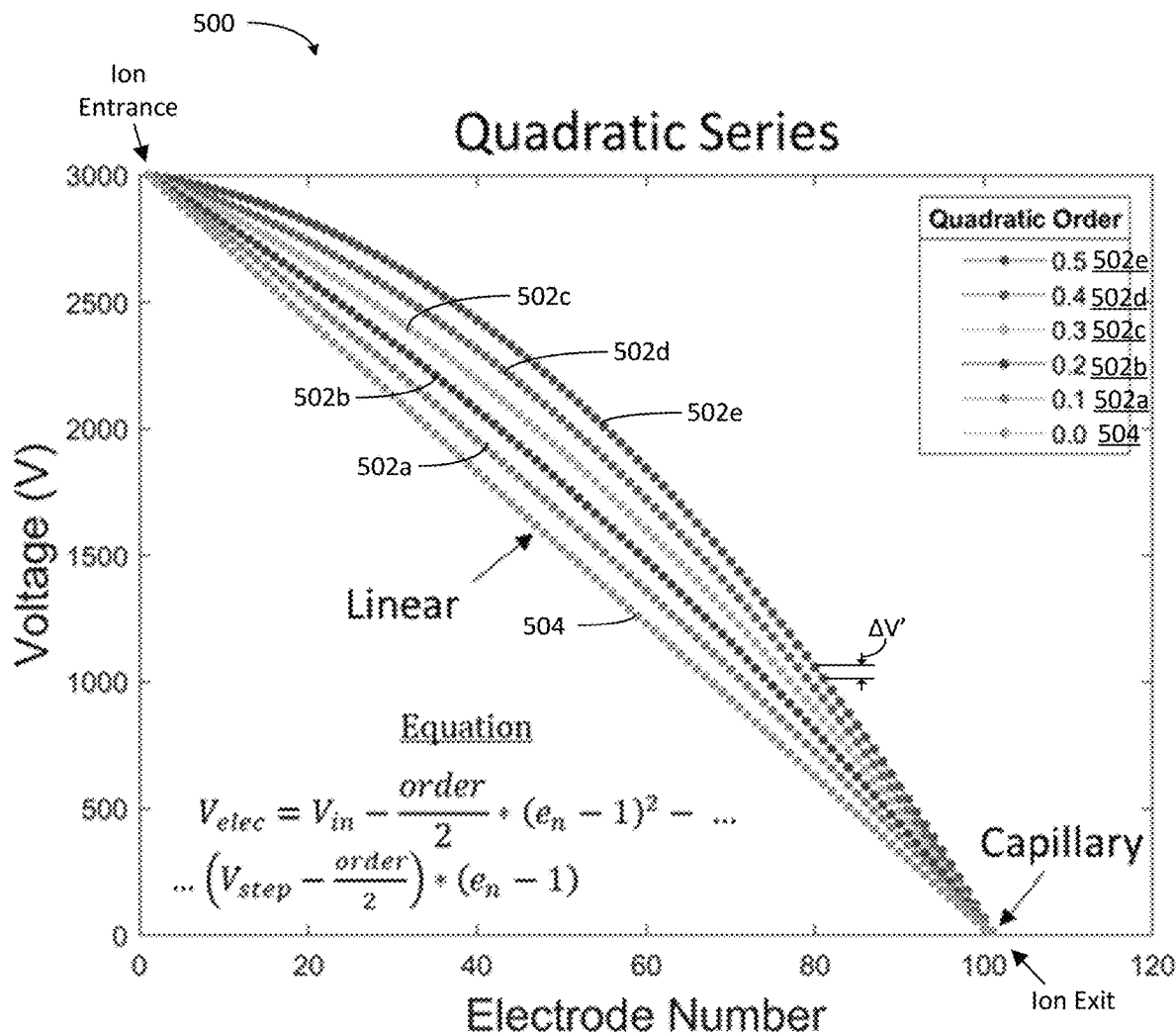

FIG. 4 and FIG. 5 are examples of nonlinear voltage sequences that can be applied to the electrode arrangements 102, 302 and other electrode arrangements. FIG. 4 shows various power sequences 402a-402e (such as defined by an exponential) along with a linear sequence 404 plotted in a graph 400, and FIG. 5 shows various quadratic sequences 502a-502e along with a linear sequence 504 plotted in a graph 500. The power series examples 402a-402e follow a power expression of the form $y=ax^b+c$ and can be described by equation 1 below:

$$V_{Elec} = V_{in} + \frac{V_{step}}{order-1} \times (1 - order^{e_n-1})  \quad \text{Eq. 1}$$

Where $V_{Elec}$ is the voltage applied to electrode n, $V_{in}$ is the voltage applied to the first electrode of an electrode arrangement, order is the sequence order, and $V_{step}$ is a number added to the order every time the electrode number increases. Values of $V_{step}$ can be determined by rearranging equation 1 to obtain an expression such as the one shown in equation 2, where $V_{step}$ is a function of the sequence order and the initial voltage $V_{in}$:

$$V_{step} = (V_{Elec} - V_{in}) \times \left( \frac{order-1}{1-order^{e_n-1}} \right) \quad \text{Eq. 2}$$

Similarly, the quadratic sequences 502a-502e can follow a quadratic equation of the form $y=ax^2+bx+c$ and can be described by equation 3:

$$V_{Elec} = V_{in} - \frac{order}{2} \times (e_n - 1)^2 - \left( V_{step} - \frac{order}{2} \right) \times (e_n - 1) \quad \text{Eq. 3}$$

As with the power sequence, an expression for $V_{step}$ from the quadratic sequence can be obtained by rearranging equation 3 to obtain equation 4:

$$V_{step} = \left( \frac{V_{in} - V_{Elec} - \frac{order}{2} \times (e_n - 1)^2}{e_n - 1} \right) + \frac{order}{2} \quad \text{Eq. 4}$$

In applying equations 2 and 4 to the one-hundred electrodes of the electrode arrangement 302 of the focusing device 300, values for $V_{step}$ can be determined for example, by setting n=101 to account for the voltage applied to both the electrode arrangement 302 and to an ion receiver 318 (e.g., a collection plate, capillary, or other ion receiver) such that $V_{Elec}=V_{101}$. For example, Table 1 lists the values of $V_{step}$ for both the power sequences 402a-402e and the quadratic sequences 502a-502e in an 100-electrode system (e.g., n=101) with different initial voltages (V) $V_{in}$ (2 kV, 3 kV, and 4 kV), appropriate values for the order, and a voltage of 15 V applied to the ion receiver 318.

TABLE 1

| Order | $V_{step}$ | | |
|---|---|---|---|
| | 2 kV | 3 kV | 4 kV |
| Power Series | | | |
| 1.00 | 20.00 | 30.00 | 40.00 |
| 1.01 | 11.64 | 17.51 | 23.38 |
| 1.02 | 6.36 | 9.56 | 12.76 |
| 1.03 | 3.27 | 4.92 | 6.56 |
| 1.04 | 1.60 | 2.41 | 3.22 |
| 1.05 | 0.76 | 1.14 | 1.53 |
| Quadratic Series | | | |
| 0.0 | 20.00 | 30.00 | 40.00 |
| 0.1 | 14.90 | 24.90 | 34.90 |
| 0.2 | 9.95 | 19.95 | 29.95 |
| 0.3 | 5.00 | 15.00 | 25.00 |
| 0.4 | 0.05 | 10.05 | 20.05 |
| 0.5 | N/P | 5.10 | 15.1 |

The values for $V_{step}$ listed in Table 1, can be substituted into the power and quadratic sequences of equations 1 and 3, respectively, to generate the graphs 400, 500 that are illustrative of $V_{Elec}$ has a function of the number of electrodes n. The graphs 400, 500 further show that the nonlinear DC voltage sequences create a voltage difference ΔV, ΔV' between adjacent electrodes that is constantly changing along the length of the electrode arrangement. Both power and quadratic sequences establish relatively low voltage differences ΔV, ΔV' between electrodes at the beginning of the electrode arrangement but can have larger voltage differences further along and toward the end of the electrode arrangement. For example, in contrast to the linear sequence 404 shown in FIG. 4, where the voltage difference between individual electrodes is constant, the power sequence 402a of an order 1.01 generates an 18 V voltage difference ΔV between the first two electrodes of the electrode arrangement and a 46 V difference ΔV between electrodes 99 and 100. Further, this effect the power sequence has on voltage difference can be enhanced by increasing the sequence order, leading to the creation of significantly low voltage differences between electrodes at the beginning of the electrode arrangement and significantly high voltage differences between electrodes at the end of the electrode arrangement. For example, in contrast to the power sequence 402a, the power sequence 402e of an order 1.05, establishes a 1 V difference ΔV between the first and second electrodes and a 137 V difference ΔV between the final two electrodes of the electrode arrangement 102. As observed in the graph 400, the power sequences 402b-402d for varied order values between the sequences 402a and 402e illustrate how the voltage differences vary as the number of electrodes of the electrode arrangement 102 increases (e.g., as its length increases).

Similarly, FIG. 5 shows that like trends can be present in quadratic sequences 502a-502e. However, as shown in the graph 500, the voltage differences ΔV' between electrodes are not as large in comparison to those found in the power sequences 402a-402e. As a result, the quadratic sequences 502a-502e differ less from the voltage differences observed in the linear sequence 504 than that of the power sequences 402a-402e, as the number of electrodes in the electrode arrangement increases. Consequently, the quadratic sequences 502a-502e tend to lead to larger voltage differences ΔV' at the beginning of an electrode arrangement and lower voltage differences near the end of the electrode arrangement, as compared to the power sequences 402a-402e.

Figure 6:
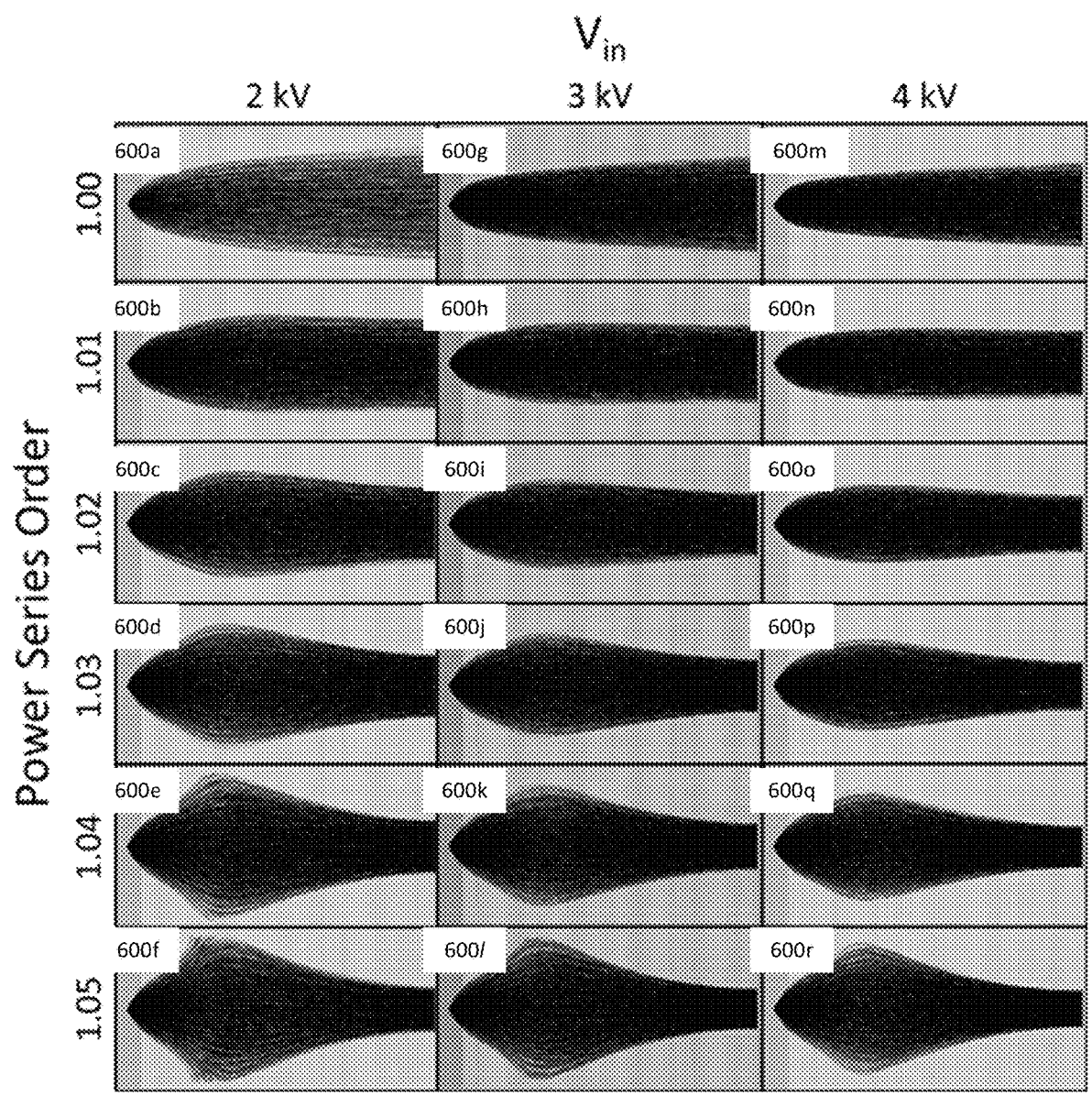
FIG. 6 is a set of side views of ion trajectories for linear and power nonlinear sequences.
Figure 7:
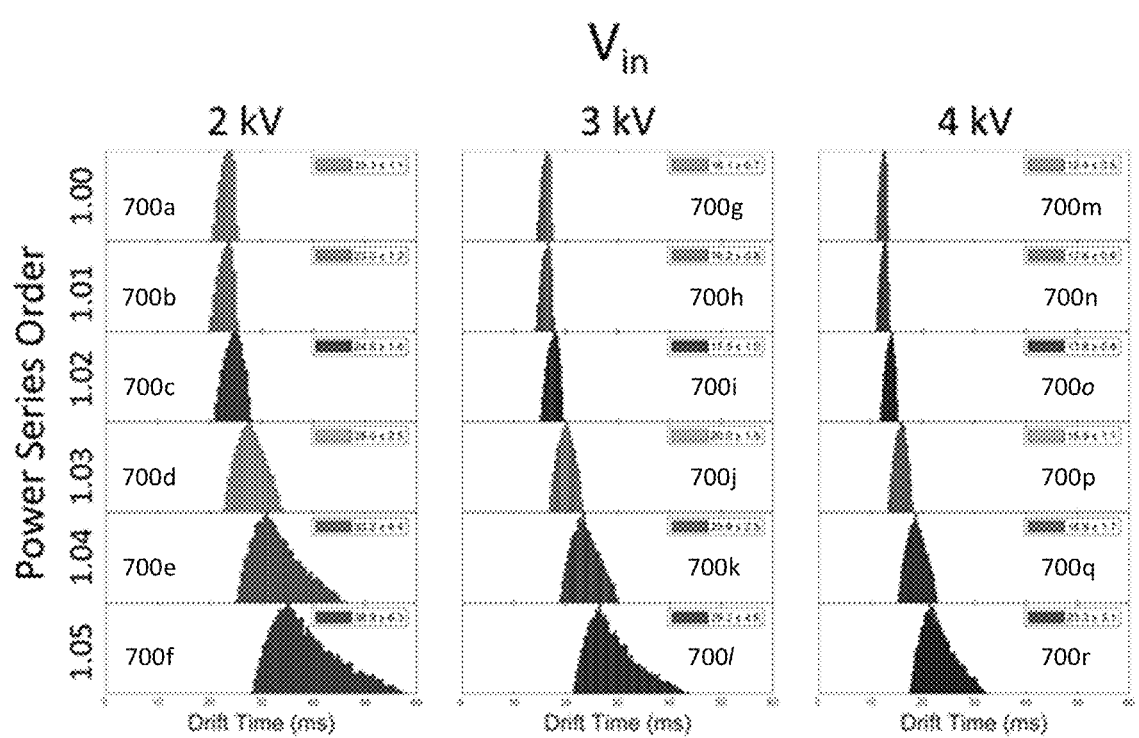
FIG. 7 is a set of graphs of drift times for the ion trajectories in FIG. 6.
Figure 9:
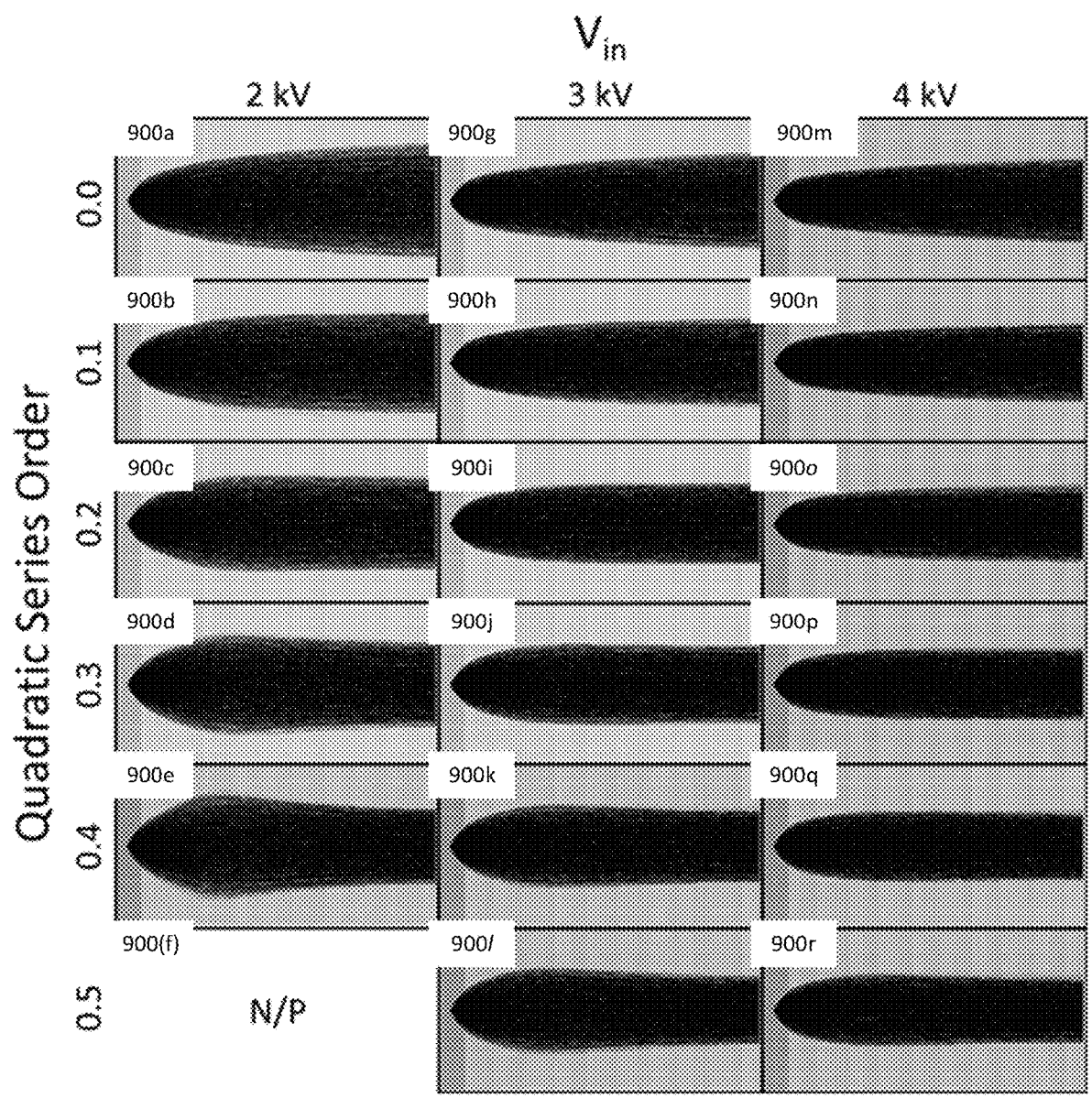
FIG. 9 is a set of side views of ion trajectories for linear and quadratic nonlinear sequences.

FIGS. 6 and 9 show experimental ion trajectory results of application of both linear and nonlinear DC voltage gradients to an electrode arrangement, such as the electrode arrangement 302. The experiments used 10,000 ions (e.g., 1000 ions per run over 10 runs) with a mass to charge ratio (m/z) of 100 per experiment, resulting in a total space charge of $2 \times 10^{-11}$ C per run (e.g., $2 \times 10^{-14}$ C per ion).

First, a linear voltage gradient (e.g., order of 1.00) was applied to the electrode arrangement 302 of FIG. 3 to obtain reference ion trajectory graphs 600a, 600g, 600m and 900a, 900g, 900m for the three starting voltages of 2 kV, 3 kV, and 4 kV. As shown in both FIGS. 6 and 9, as the ions are introduced into the electrode arrangement 302, radial expansion of the ions is observed throughout the length of the electrode arrangement 302 with narrower profiles, showing similar effects, obtained with increasing voltage.

The resulting trajectory profiles for power sequence nonlinear voltage application for the three initial voltages and their respective orders 1.00, 1.01, 1.02, 1.03, 1.04, and 1.05 are shown in ion trajectory graphs 600b-600f, 600h-600l, 600n-600r. As can be seen in ion trajectory graph 600b, when low power orders are used, the ions maintain a relatively straight trajectory through the electrode arrangement 102. At higher orders, such as order 1.05 shown in ion trajectory graph 600f, the ions initially radially expand after entering the electrode arrangement 302 but subsequently converge, or focus, at more distant positions from an ion entrance. This initial radial expansion of the ions results from the smaller voltage differences between adjacent electrodes at the beginning of the electrode arrangement 302. However, instead of continuing to radially expand, as is produced with a linear sequence (e.g. 600a, 600g, 600m), the ions traveling along the electrode arrangement 302 exhibit significant radial focusing as the voltage differences steadily increase. As observed in ion trajectory graphs 600f, 600l, and 600r, the largest amount of focusing occurs near the ion exit 316 of the electrode arrangement 302, where the largest voltage differences between electrodes are present. Consequently, the initial radial expansion at high orders of the power sequence also causes significant peak tailing, which can be seen in the power sequence drift time graphs 700a-700r in FIG. 7. Using the ion focusing device 300 as an example, due to the low voltage differences between electrodes nearer to the ion entrance 314 of the electrode arrangement 302, the ions pushed to the periphery of the electrode arrangement 302 during the initial radial expansion travel longer paths from ion entrance 314 to ion exit 316 than those initially closer to the longitudinal axis 305 during expansion, causing longer drift times to reach the ion receiver 318. In contrast, minimal tailing is observed in the quadratic sequence drift time graphs 1000a-1000r shown in FIG. 10. As described herein, because the quadratic sequence results in larger voltage differences between adjacent electrodes at the beginning of the focusing device, ions undergo minimal initial radial expansion and thus, exhibit little peak tailing, if any at all.

Figure 8:
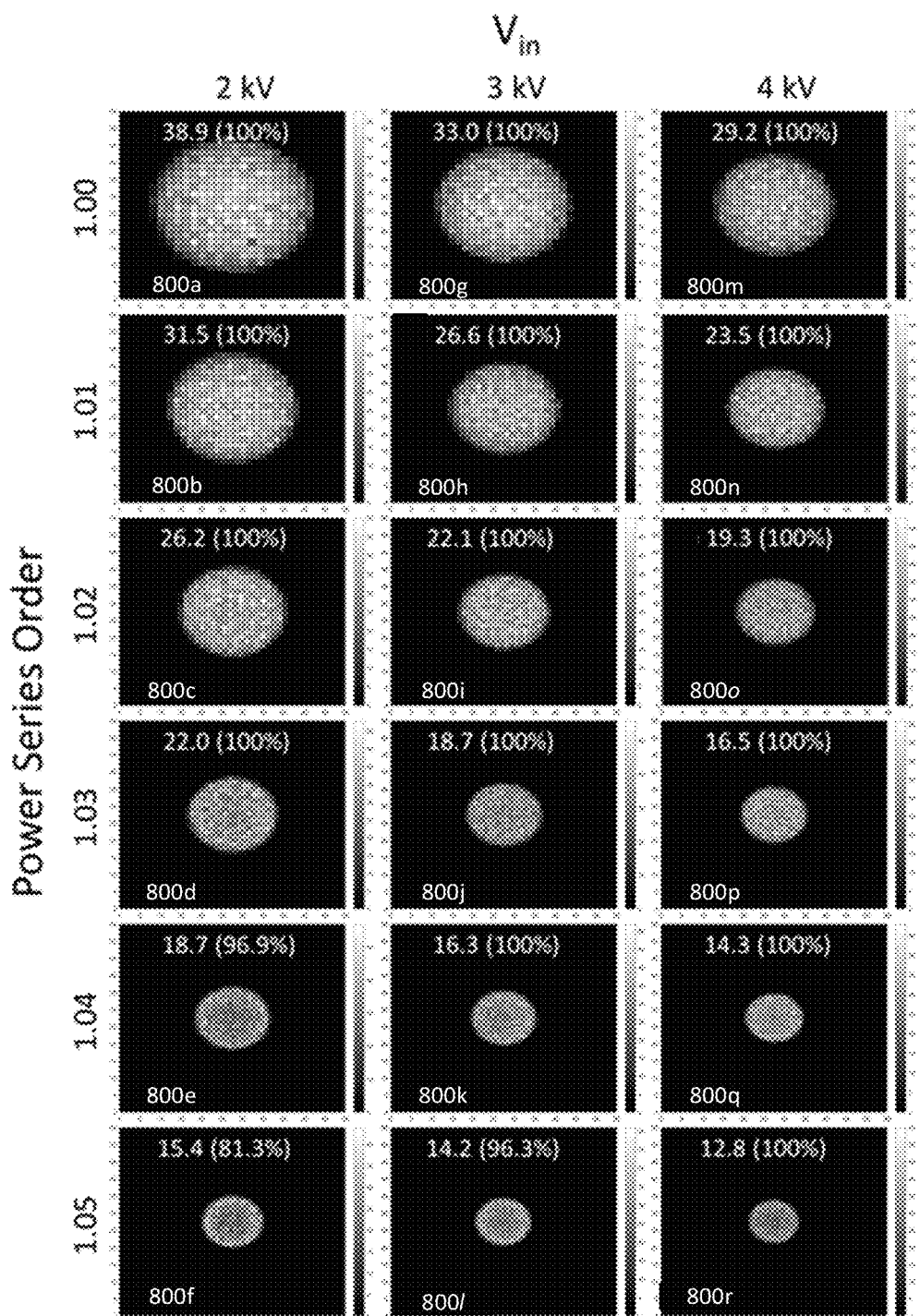
FIG. 8 is a set of plots of spot diameters for the ion trajectories in FIG. 6.

FIG. 8 shows a series of ion intensity plots 800a-800r showing variation in focusing obtained with power nonlinear DC voltage gradient sequences and linear voltage gradient sequences. For example, the nonlinear DC voltage of the power sequence of order 1.05 (e.g., 800f, 800l, 800r) produced focusing that was approximately 2.5 times greater than the focusing achieved by the linear sequences (e.g., of order 1.00 shown in 800a, 800g, 800m). In FIG. 8, the spot diameter in mm of the ions leaving the electrode arrangement 302 is indicated by the values outside of the parenthesis, while the values inside parenthesis indicate the ion transmission as a percentage. As shown in FIG. 8, the spot diameters of the linear voltage gradients 800a, 800g, 800m are approximately between 2.25 to 2.5 larger than the spot diameters of the nonlinear DC voltage gradients associated with ion intensity plots 800f, 800l, 800r. Other spot diameters are obtained by varying power sequence orders. Use of larger power orders can result in ion loss due to considerable ion expansion near the ion entrance, such as the traces shown in the ion trajectory plots 600c-600f. In some examples, related ion losses are reduced by increasing an initial voltage of the electrode arrangement, such as that shown for 600h-600l and 600n-600r. In further examples, losses can be used as a filter of ions with selected initial trajectories, such as trajectories that are angled with respect to an axis of the focusing device.

Figure 11:
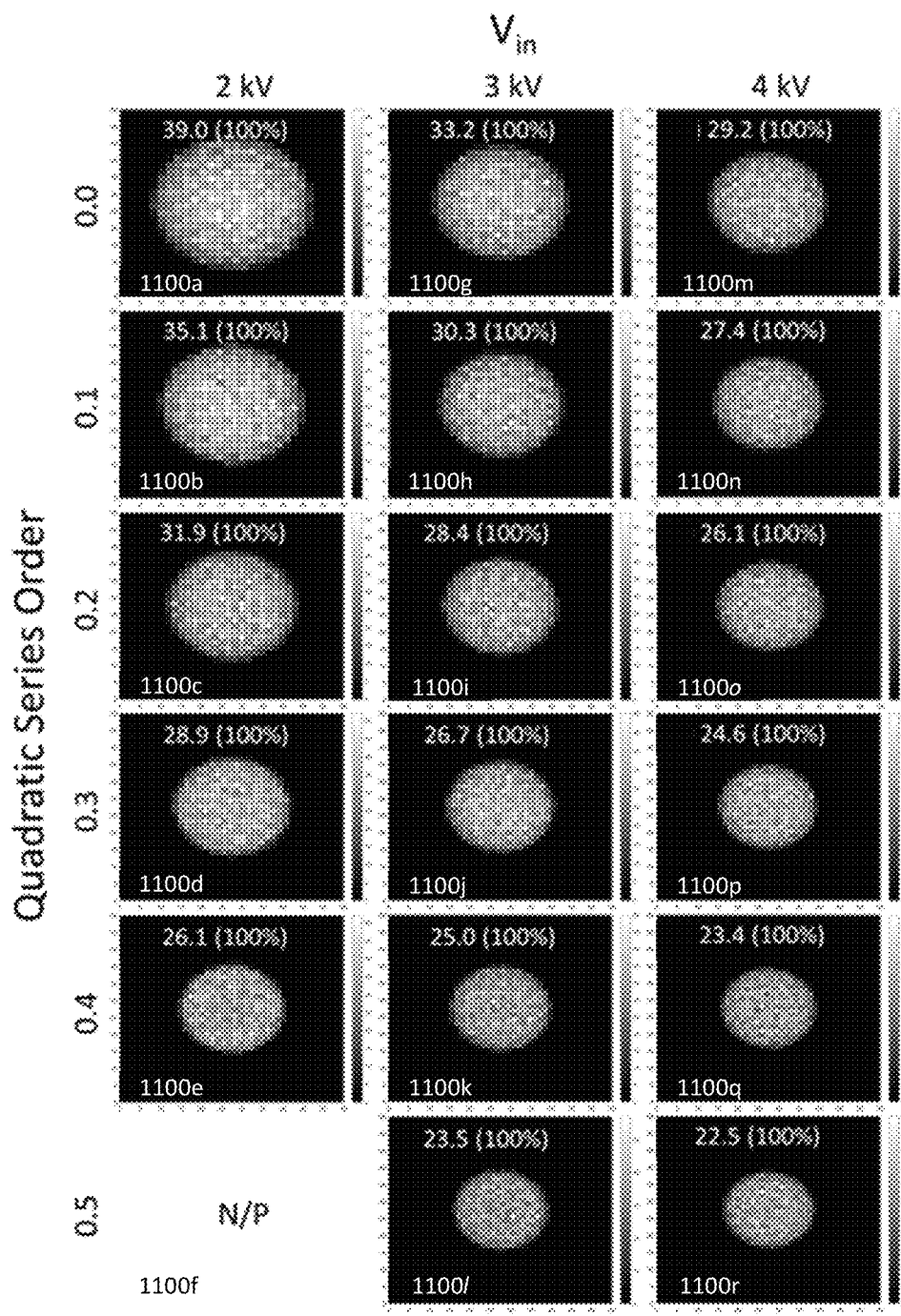

FIGS. 9 and 11 show the ion trajectories 900a-900r and ion intensity plots 1100a-1100r produced by applying the quadratic series voltages, using sequence order values of 0.0, 0.1, 0.2, 0.3, 0.4, and 0.5, and the same initial voltages used for the power sequence examples in FIGS. 6 and 8. The quadratic series produced minimal to no ion losses as the ions are directed along through the volume 306 by the electrode arrangement 302. For example, ion trajectories 900h-900l and 900n-900r show that ions experience little to no radial expansion after being introduced into the electrode arrangement 302. The ions subsequently travel the length of the volume 306 defined by the electrode arrangement 302 in a relatively straight line, rather than radially expanding as observed with the linear voltage sequence. This lack of initial ion defocusing (e.g., radial expansion) within the volume 306 of the electrode arrangement 302 results from the large voltage differences formed between the electrodes at the beginning of the electrode arrangement 302, which almost entirely avoids ion losses. This is in contrast to the small voltage differences at the beginning of the electrode arrangement 302 observed when applying one of the example power sequence voltage gradients, which as mentioned above, can produce considerable ion expansion after the ions are introduced. It should be noted, that a combination of $V_{in}$ equal to 2 kV, $V_{Elec}$=Viol equal to 15 V, and an order of 0.5 produces a positive voltage gradient at the beginning of the device, meaning ion transmission through device is not possible, as denoted by the N/P at ion trajectory 900f.

Figure 10:
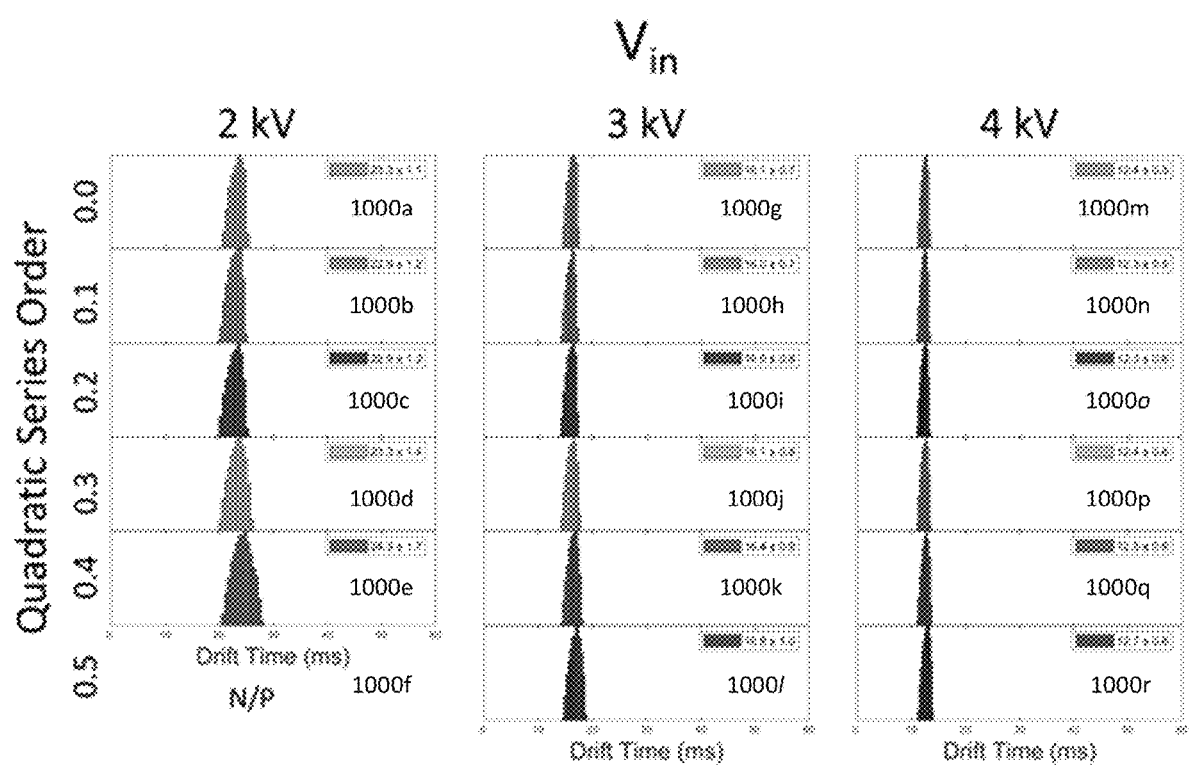
FIG. 10 is a set of graphs of drift times for the ion trajectories in FIG. 9.

In comparison to the power sequence examples, quadratic sequence examples can be configured to provide a modest amount of ion focusing. As shown in FIG. 11, focusing effects from application of quadratic sequence voltages can be approximately 1.4 times larger than the linear voltage gradient, as opposed to the 2.5 times achieved by applying power sequence examples. For example, when a sequence order of 0.5 and an initial voltage ($V_{in}$) of 3 kV are used, the spot diameter produced by the nonlinear quadratic sequence is approximately 23.5 as shown in ion intensity plot 1100*l* versus the 33.2 shown in ion intensity plot 1100*g* obtained with a linear voltage sequence. In examples, in contrast to the power sequence, as the order of the quadratic sequence is increased, drift time distributions can be observed without significant changes in peak widths, as shown in FIG. 10. Overall drift times for quadratic sequence examples can be considerably lower than those observed in power sequence examples (e.g., FIG. 7), and can be attributable to the lack of initial ion radial expansion, associated with larger voltage differences between electrodes nearer the entrance of the volume 316 and related reduction in ion travel distances.

Figure 12:
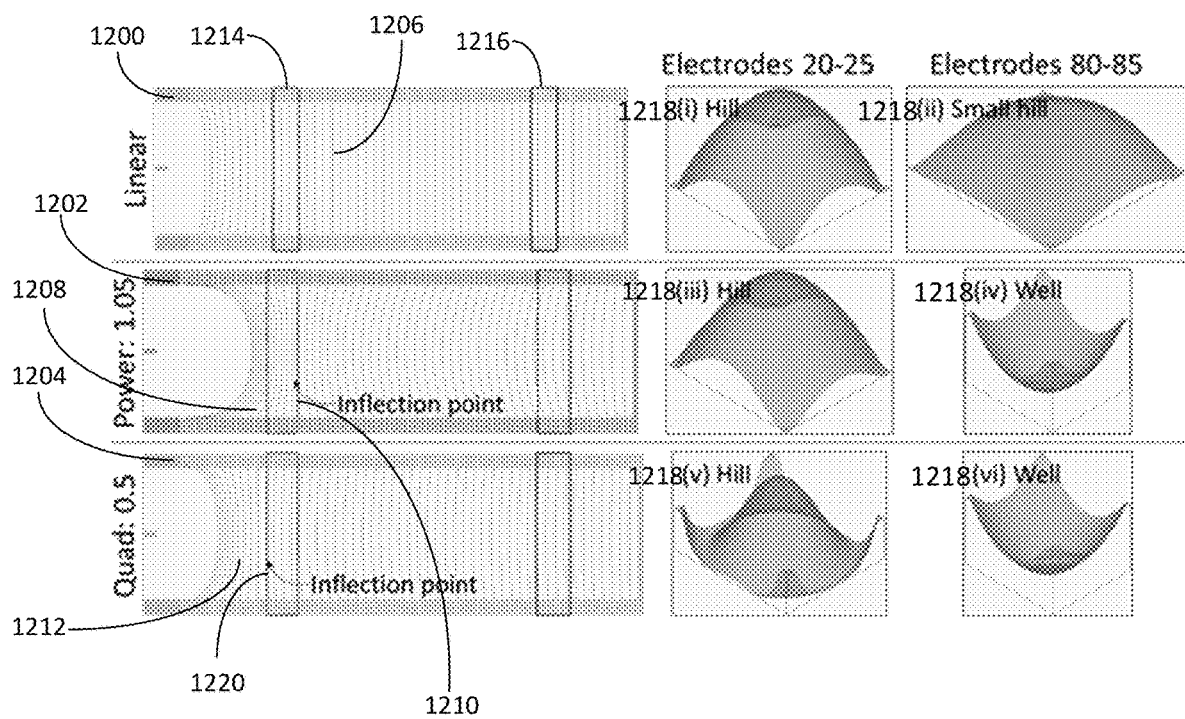
FIG. 12 are side views of electric field strengths for linear, power, and quadratic voltage sequences, along with cross-sectional 2D plots associated with different electrode sets.

The effects of applying a nonlinear DC voltage demonstrate that the nonlinear DC voltage sequences cause the electric field gradient within an ion propagation volume to change as a function of distance along an electrode arrangement (i.e., spatially). For example, the linear, power (1.05), and quadratic (0.5) gradients shown in the contour plots 1200, 1202, 1204 of FIG. 12 show that the radial motion of ions are not affected by the electric field gradient when a linear sequence is applied but do become affected when the nonlinear power or quadratic sequence are applied. Vertical lines 1206 of the contour plot 1200 show that the electric field exhibits little to no radial change along the length of the electrode arrangement (e.g., electrode arrangement 102 or 302) such that any radial expansion experienced by the ions introduced into the system are likely due to diffusion and overall space charge.

In contrast, the contour plots 1202 and 1204 for the power and quadratic nonlinear sequences, respectively, show that the electric field gradient of either sequence experiences significant radial change as a function of distance. The change in the electric field gradient of a nonlinear DC voltage sequence can be seen in the contour plot 1202 for the power sequence. For example, the contour lines 1208 of contour plot 1202 curve strongly outward initially near the ion entrance 114 of the electrode arrangement 102 and then shift vertically around an inflection point 1210 (e.g., change in the curvature) located at the 25$^{th}$ electrode. The shift of the contour lines 1208 at the inflection point 1210 is consistent with the ion trajectories and ion intensity plots shown in FIGS. 6 and 8. For example, the shape of the contour plot 1202 support the observed initial defocusing effect nearer to the ion entrance of the electrode arrangement 302, as the electric field gradient initially pushes a number of the ions outward when the power sequence is applied. Similarly, after the contour lines 1208 of electric field gradient shifts at the inflection point 1210, the contour lines 1208 progressively begin to curve inward as the number of electrodes increases, supporting the observed strong focusing effects associated with the power sequence voltages (e.g., evidenced by the ion intensity plots of FIG. 8).

With reference to the contour plot 1204 associated with the quadratic sequence voltage, a similar field shape can be observed in contour lines 1212 though with less variation than the contour lines 1208 of the power sequence. Rather, the contour lines 1212 show a curvature outward and inward along the length of the electrode arrangement 302 that is less pronounced. This change in the electric field gradient produced by the quadratic sequence voltage is consistent with the ion trajectories and ion intensity plots of FIGS. 9 and 11, supporting the smaller defocusing effect nearer the entrance of the ion volume 316 and less focusing overall as compared to the power sequence.

Rather than forming a pseudopotential in time, as the systems using RF waveforms do, the constant change observed in the electric field gradient as a function of distance (though not necessarily the same change per unit distance), according to some described examples, establishes a pseudopotential well in space allowing for the spatial ion focusing at atmospheric pressure. As described herein, the pseudopotential well deepens as a function of distance, thereby providing increased ion focusing at larger distances traveled by the ions into the device. FIG. 12 further illustrates this increased ion focusing at larger distances traveled.

FIG. 12 shows the potential energy surfaces formed by the linear contour plot 1200, power contour plot 1202 (e.g., 1.05), and quadratic contour plot 1204 (e.g., 0.5) sequences at two different regions of the electrode arrangement 302, with the first region 1214 being located between electrodes 20 and 25 and with the second region 1216 being located between electrodes 80 and 85. For the linear voltage sequence, a potential energy "hill" 1218(*i*) is observed in the first region 1214 and flattens along the length electrode arrangement 302 where only a small potential hill 1218(*ii*) is observed in the second region 1216. The small "hill" 1218(*ii*) observed at the second region 1216 further indicates that charge repulsion and diffusion are predominate factors affecting radial motion of the ions in a linear voltage sequence.

Similarly, the potential energy surfaces of the power and quadratic sequences both produce a hill within the first region 1214, as can be seen in hills 1218(*iii*), 1218(*v*), similar to the linear sequence hill 1218(*i*); however, rather than a second hill at the second region 1216, potential wells 1218(*iv*), 1218(*vi*) are observed. For example, when the power sequence is applied, the hill 1218(*iii*) formed by the potential energy surfaces at the first region 1214 begins to flatten toward the inflection point 1210, but then forms into a potential well that deepens toward the second region 1216 and end of the electrode arrangement 302. This deepening potential well observed can produce the ion focusing effect observed in FIGS. 6 and 8 toward the end of the electrode arrangement 302. Similarly, the potential energy surfaces observed for the quadratic sequence show a hill 1218(*v*) in the first region 1214 and a potential well 1218(*vi*) in the second region 1216. However, the potential well 1218(*vi*) observed with the quadratic sequence is more shallow along the electrode arrangement 302 than that of the one observed with the power sequence, which corresponds to the reduced ion focusing effect demonstrated earlier with regard to the ion trajectories and ion intensity graphs of FIGS. 9 and 11.

The following figures show representative methods for implementing the nonlinear DC voltages of the present disclosure in order to utilize the foregoing ion focusing effects. It should be noted that although the methods described herein are listed in a sequence, the various steps listed do not necessarily have to follow the sequence but may be undertaken in any manner suitable for the intended use.

Figure 13:
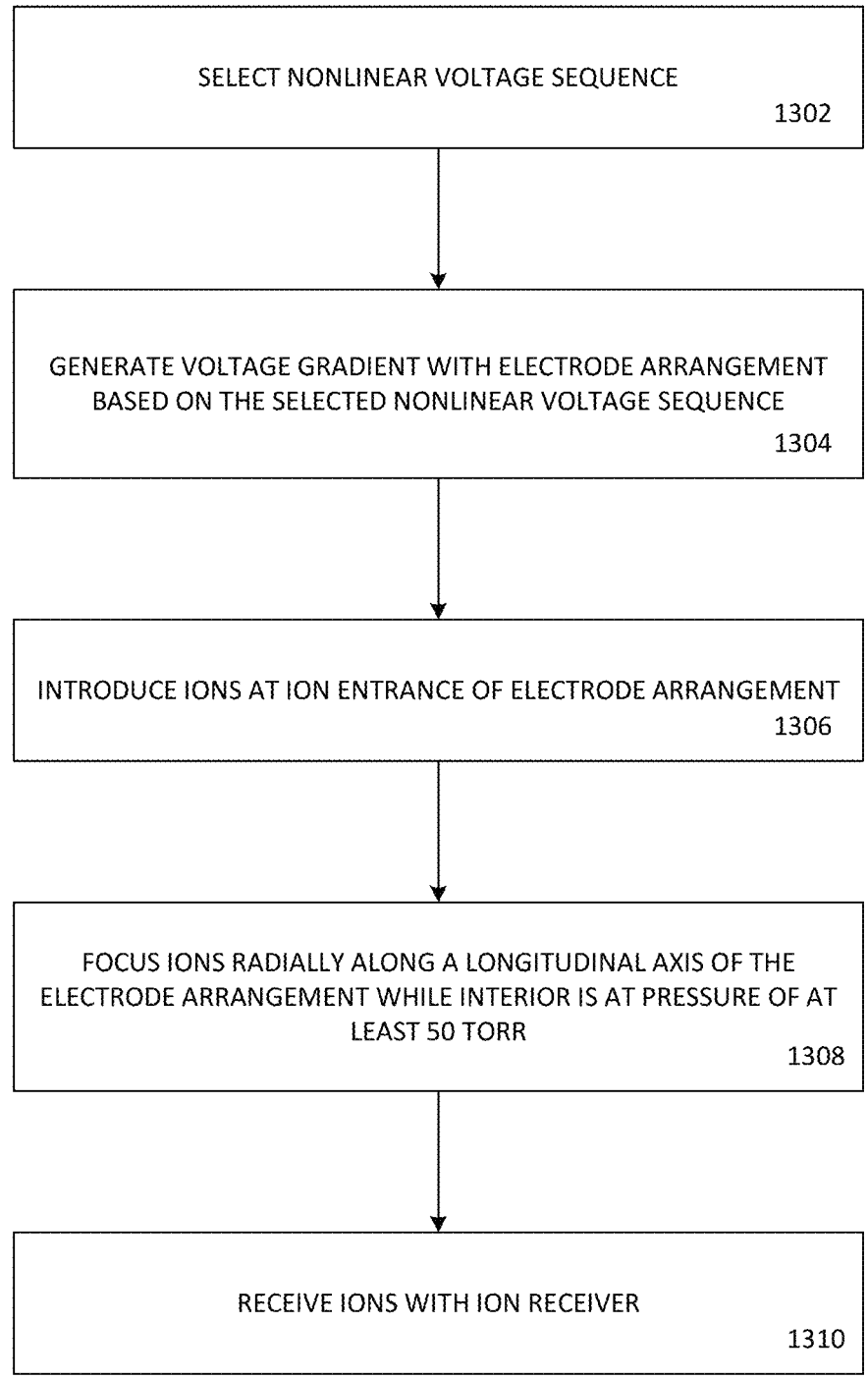
FIG. 13 is a flowchart of an ion focusing method.
Figure 16:
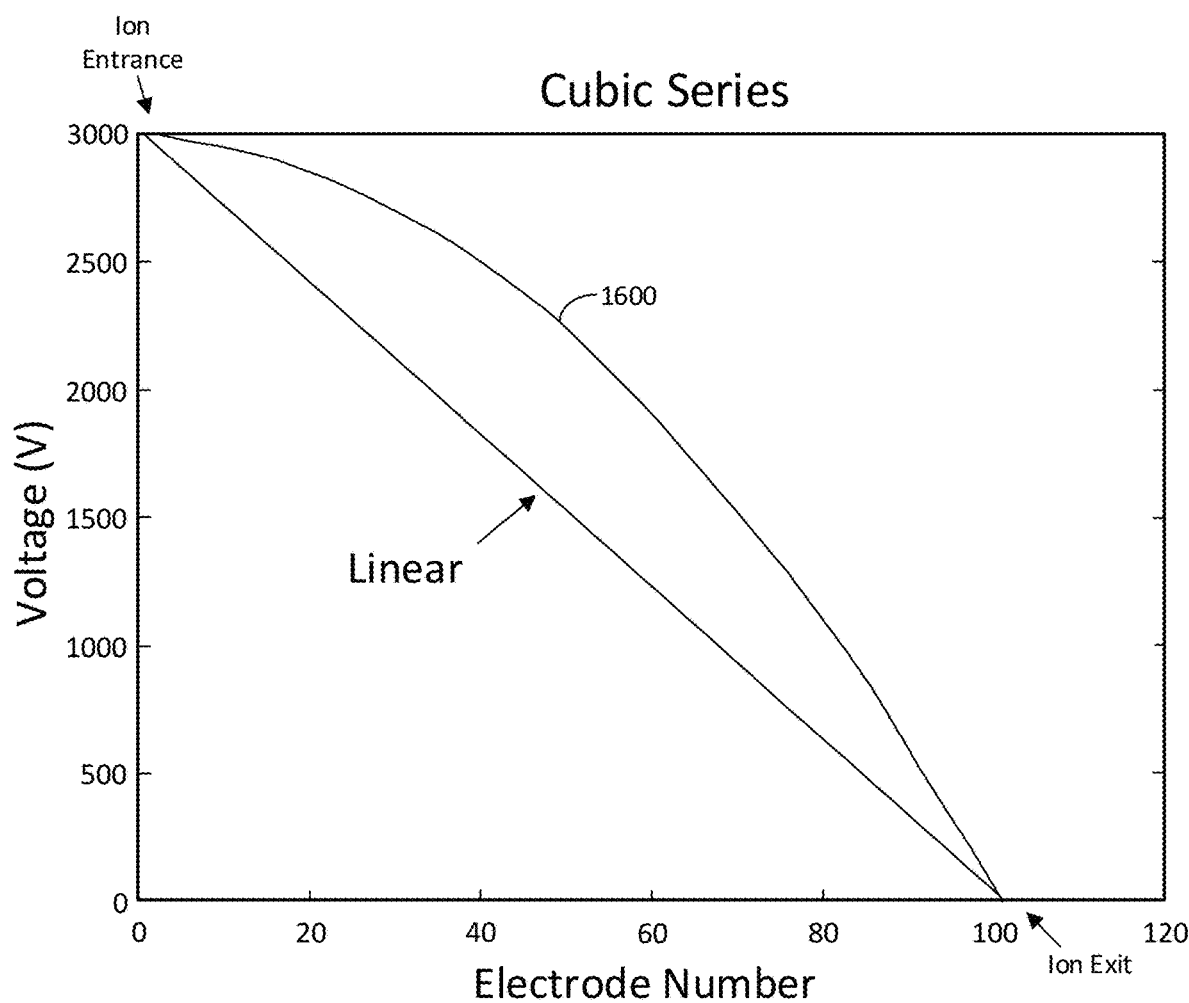
FIGS. 16-17 are schematic examples of a cubic voltage sequence and a polynomial sequence of order n.
Figure 17:
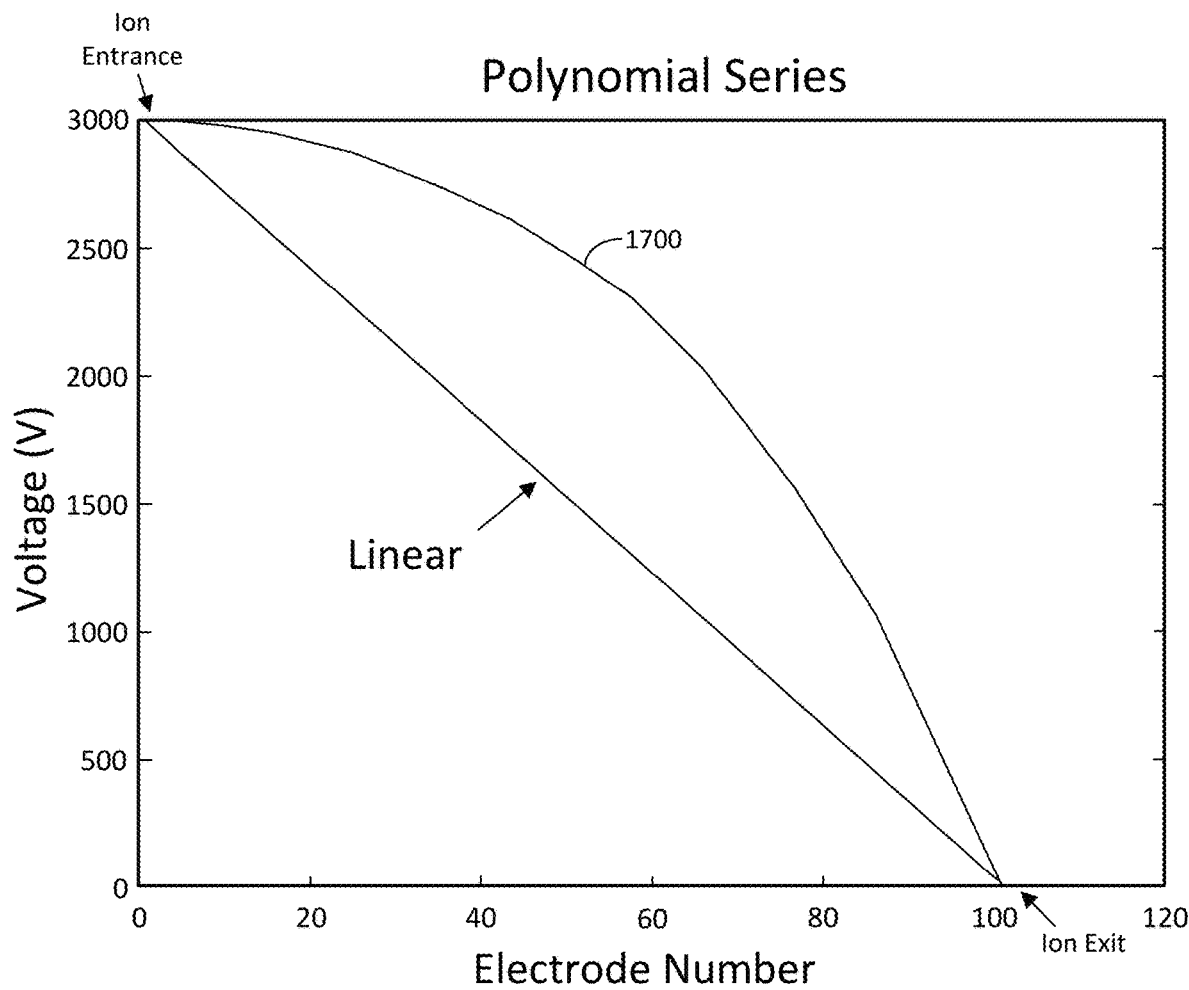

FIG. 13 shows a representative method of applying a single nonlinear voltage sequence to focus ions in an environment at 1 Torr or greater, such as at atmospheric pressure. At 1302, an operator can use a display or other interface, or initiate through a pre-programmed ion focus routine, to select a nonlinear voltage sequence. In some examples, the nonlinear voltage sequence can be a power or quadratic nonlinear voltage sequence, or another nonlinear voltage sequence, including but not limited to, a cubic function, a complex wave function, and/or any polynomial of order "n." FIGS. 16 and 17, for instance, schematically depict examples of a cubic voltage sequence 1600 and a polynomial sequence 1700 of order n=4, respectively. In some examples, a coupled device, such as an ion receiving apparatus, mass spectrometer, ion mobility spectrometer, etc., can specify and/or control selection of the nonlinear voltage sequence based on, e.g., a specified analytical process specified by the operator and/or automated output. In some examples, the selected nonlinear voltage sequence is associated with measurement of ion focusing intensity or time-of-flight measurements. At 1304, the selected nonlinear DC voltage gradient is applied to an electrode arrangement defining an ion focusing volume. The applied voltages form voltage differences between adjacent electrodes of the electrode arrangement to produce a nonlinear voltage gradient within the ion focusing volume.

At 1306, ions are introduced into the ion focusing volume through an ion entrance and at 1308, the electrode arrangement with applied nonlinear voltage sequence focuses ions radially as the ions propagate along a direction of a longitudinal axis of the ion focusing volume. In representative examples, the ions are introduced at predetermined times in relation to the applied nonlinear voltage gradient. The ions are focused within the volume with the volume at pressures that are larger than substantial vacuum conditions, such as at 1 Torr or greater, 50 Torr or greater, 100 Torr or greater, 200 Torr or greater, 500 Torr or greater, 760 Torr or greater, etc.

As described herein, as the ions are introduced into the electrode arrangement at 1306, the ions are directed and focused at 1308 through the volume defined by the electrode arrangement and applied nonlinear voltage sequence by the electric field gradient formed by the voltage differences. At 1310, the ions exit the ion focusing volume and are received by an ion receiver, such as an ion analyzer, mass spectrometer, ion mobility spectrometer, collection plate, current detector, ion conduit, etc. In examples, the ions can be captured by an ion receiver. In further examples, the ion receiver is and/or can be coupled to an ion analyzer, such as a mass spectrometer and/or an ion mobility spectrometer, including spectrometers with an atmospheric pressure interface. In other examples, the ion analyzer can be another analytical device and/or can be an optical device to focus the captured ions into an ion beam for atmospheric pressure ion manipulation, such as in surface functionalization and/or soft-landing processes, including for deposition of the ions. In further examples, the ion receiver can be any one and/or combination of various ion manipulation devices, such as an ion confinement apparatus, ion focusing device, ion mobility device, and/or ion mass spectrometer, all of which can operate under atmospheric pressure.

Figure 14:
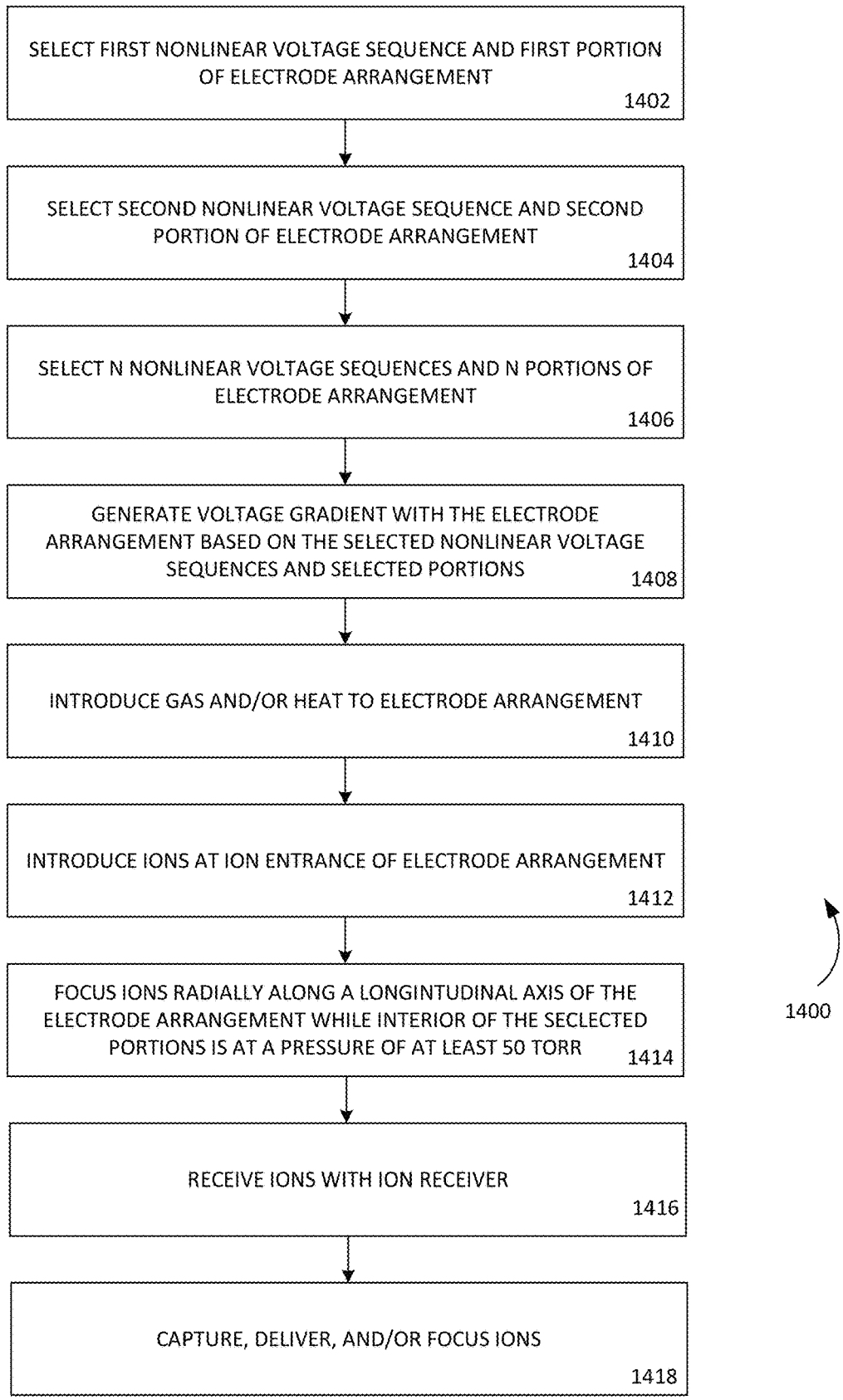
FIG. 14 is a flowchart of another ion focusing method.

FIG. 14 depicts an example method 1400 of generating a nonlinear DC voltage gradient with one or more nonlinear sequences, such as a combination of two or more sequences. By using two or more nonlinear voltage sequences concurrently, or varying one or more over time, various benefits can be obtained. For example, ions exhibit an initial radial expansion and intense focusing when a power sequence is applied, but exhibit little to no initial radial expansion and moderate focusing when a quadratic sequence is applied. Thus, in some examples, a first nonlinear DC voltage gradient is based on a quadratic sequence and can be applied to a first portion of an electrode arrangement, and a second gradient based on a power sequence can be applied to a second portion of the electrode arrangement.

Figure 15:
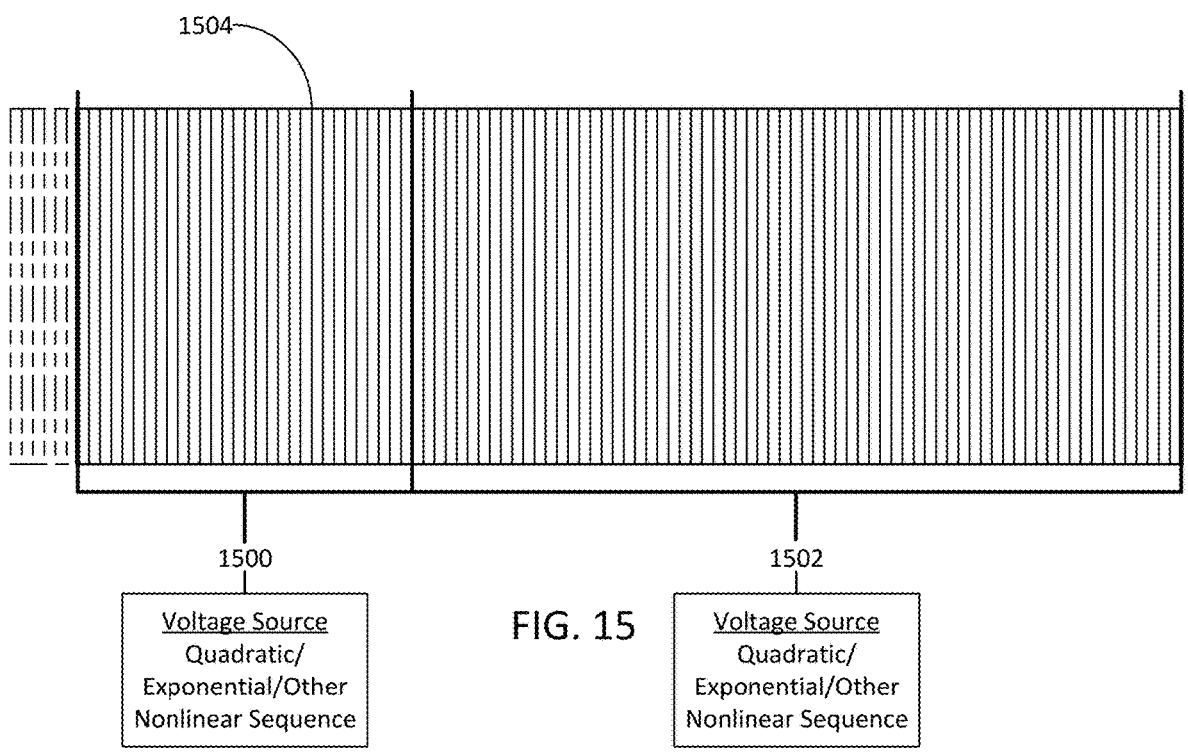

For example, at 1402, 1404 an operator and/or controller can select a quadratic sequence to be applied to a first portion of an electrode arrangement and a power sequence to be applied to a second portion of the electrode arrangement, e.g., as illustrated in FIG. 15 with first portion 1500, second portion 1502, of electrode arrangement 1504. At 1408, a voltage gradient is generated in an ion volume with the selected nonlinear sequences applied to each respective portion of the electrode arrangement, such as generating and applying the selected quadratic sequence to first portion 1500 and the power sequence to second portion 1502. In some examples, at 1410, heat and/or gas is introduced into the volume by the heating block or gas source (including, e.g., multiple gases), respectively. Heat can be used to incorporate constant or variable temperature conditions and gas can be used to alter separation efficiency for molecules. In some examples, introduced gas and/or heat can be selected and/or controlled to increase desolvation of the ions introduced into the volume.

At 1412, as ions are introduced at the ion entrance of the electrode arrangement, the combination of nonlinear DC voltage sequences generated and applied at 1408 focus the ions radially along a direction of a longitudinal axis of the ion focusing volume defined by the electrode arrangement. In this way, the combination of nonlinear DC voltages reduce a radial expansion of the ions under a quadratic voltage sequence at the first portion 1500 (e.g., up to the inflection point 1220) and increase focusing of the ions under the power voltage sequence through the section portion 1502 (e.g., after inflection point 1210). Thus, in this example, ion losses can be reduced through the varying of nonlinear voltage sequences along the length of an electrode arrangement. Such a distribution of the sequences could be helpful, for example, when a higher flux of ions is directed through the ion volume defined by the electrode arrangement. At 1418, as the ions propagate along the longitudinal axis of the electrode arrangement and are received at the ion exit at 1416, the ions can be captured, delivered to an ion analyzer, such as an atmospheric ion spectrometer, and/or be focused as to become an ion source for other processes.

Figure 18:
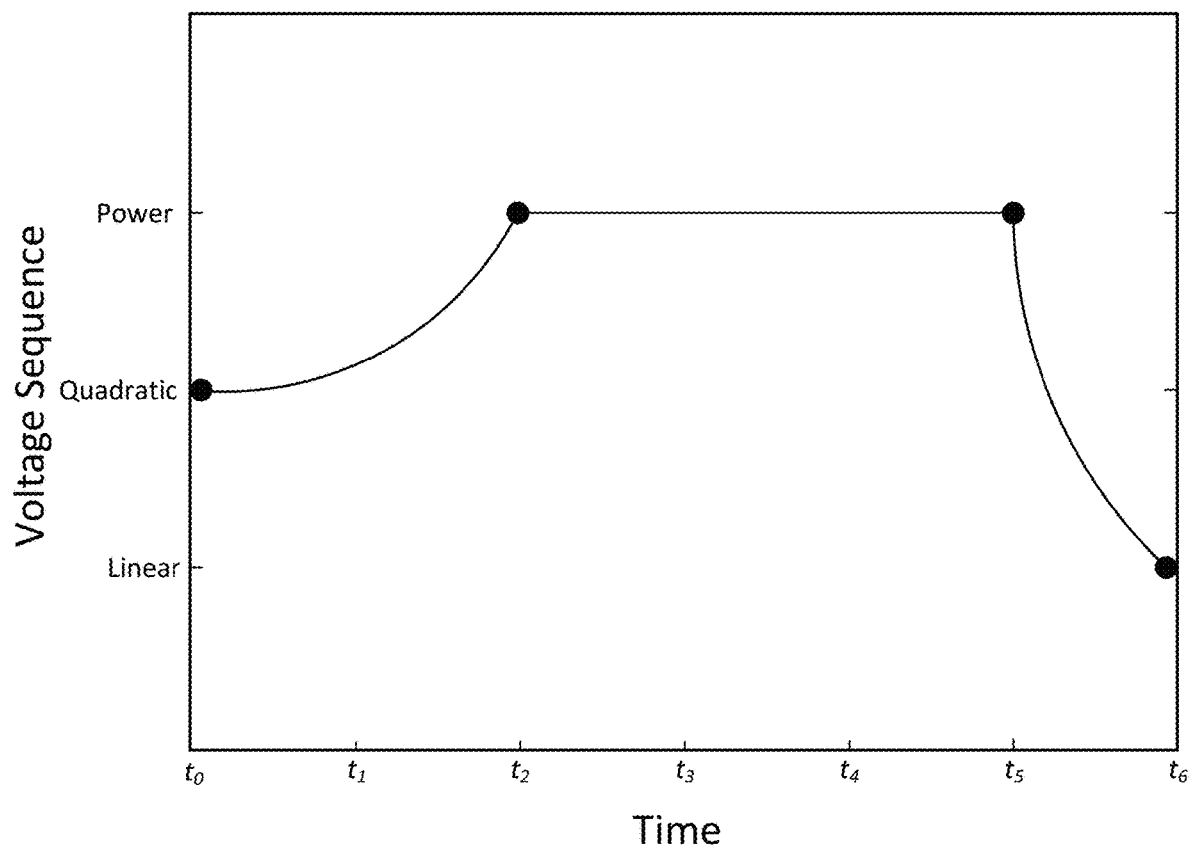
FIG. 18 is a plot of a DC voltage sequence varied between different nonlinear DC voltage sequences over time.

In other examples, the quadratic sequence and power sequence can be switched to create radial expansion of ions at the beginning of the electrode arrangement and moderate focusing through the rest of the arrangement, such as to study the effects on ions propagating along a particular length of an electrode arrangements. Some method examples can include, for example at 1406, one or more additional sequences (e.g., n number of nonlinear sequences) in addition to the first and second nonlinear voltage sequences to achieve a desired ion focusing and/or defocusing effect. In further examples, the voltage sequences can vary over time, such as based on propagation of an ion packet through the volume. As one example, FIG. 18 shows a DC voltage sequence varying between different nonlinear DC voltage sequences over a time $t_0$-$t_6$.

Although ion focusing was demonstrated herein with the power sequence and quadratic sequence, the advantages of the system and methods of the present disclosure are not limited to such sequences but rather may be used with other nonlinear polynomial functions of order "n," in accordance with the system and methods described herein.

Having described and illustrated the principles of the disclosed technology with reference to the illustrated embodiments, it will be recognized that the illustrated embodiments can be modified in arrangement and detail without departing from such principles. For instance, elements of the illustrated embodiments shown in software may be implemented in hardware and vice-versa. Also, the technologies from any example can be combined with the technologies described in any one or more of the other examples. It will be appreciated that procedures and functions such as those described with reference to the illustrated examples can be implemented in a single hardware or software module, or separate modules can be provided. The particular arrangements above are provided for convenient illustration, and other arrangements can be used.

In view of the many possible embodiments to which the principles of the disclosed technology may be applied, it should be recognized that the illustrated embodiments are only representative examples and should not be taken as limiting the scope of disclosure. Alternatives specifically addressed in these sections are merely exemplary and do not constitute all possible alternatives to the embodiments described herein. For instance, various components of systems described herein may be combined in function and use. We therefore claim all that comes within the scope of the appended claims.

We claim:

1. An apparatus, comprising:
   an electrode arrangement comprising a plurality of electrodes defining a volume, an ion entrance, and an ion exit; and
   a voltage source coupled to the plurality of electrodes and configured to apply a nonlinear DC voltage sequence to the electrodes between the ion entrance and the ion exit that focuses and directs ions along a length and through the volume of the electrode arrangement, wherein the volume is at a pressure of at least 1 Torr and at least a portion of the nonlinear sequence includes a quadratic DC voltage sequence.

2. The apparatus of claim 1, wherein the volume is at a pressure of at least 50 Torr and above.

3. The apparatus of claim 1, wherein the volume is at a pressure of at least 760 Torr and above.

4. The apparatus of claim 1, wherein the nonlinear DC voltage sequence is defined by a voltage difference between adjacent electrodes that increases nonlinearly from the ion entrance to the ion exit.

5. The apparatus of claim 1, wherein at least a portion of the nonlinear DC voltage sequence includes an exponential DC voltage sequence.

6. The apparatus of claim 1, wherein the nonlinear DC voltage sequence includes the quadratic DC voltage sequence along a first length and an exponential DC voltage sequence along a second length adjacent to the first length.

7. The apparatus of claim 1, further comprising an ion receiver coupled to the ion exit.

8. The apparatus of claim 7, wherein the ion receiver is an ion analyzer or is coupled to an ion analyzer.

9. The apparatus of claim 7, wherein the ion receiver is a collection plate, an ion mobility spectrometer, or a mass spectrometer.

10. The apparatus of claim 7, wherein the ion receiver is an ion trap.

11. The apparatus of claim 7, wherein the ion receiver is an atmospheric pressure confinement device for ion manipulation.

12. The apparatus of claim 1, further comprising an ion source coupled to the ion entrance.

13. The apparatus of claim 12, wherein the ion source is an electrospray ionization source, a plasma ionization source, an atmospheric pressure chemical ionization source, an atmospheric pressure photoionization source, electron impact ionization source, or a combination thereof.

14. The apparatus of claim 1, further comprising a housing supporting the electrode arrangement, wherein the housing includes a gas port configured to receive a drift gas from a gas source and a heat source configured to heat the electrode arrangement and the volume.

15. The apparatus of claim 1, wherein the plurality of electrodes are circular electrodes and the electrodes are evenly spaced along, and concentrically arranged about, a common axis.

16. The apparatus of claim 15, wherein the common axis is bent or curved.

17. The apparatus of claim 1, wherein the electrodes have a non-circular cross section.

18. A method, comprising:
   applying a nonlinear DC voltage sequence to a plurality of electrodes of an electrode arrangement, wherein the plurality of electrodes define a volume, ion entrance, and ion exit, and wherein the application of the nonlinear DC voltage sequence is configured to focus and direct ions along a length and through the volume of the electrode arrangement between the ion entrance and ion exit with the volume at a pressure of at least 1 Torr, wherein at least a portion of the nonlinear DC voltage sequence includes a quadratic DC voltage sequence.

19. The method of claim 18, wherein the volume is at a pressure of at least 50 Torr.

20. The method of claim 18, further comprising introducing the ions into the volume through the ion entrance.

21. The method of claim 20, further comprising focusing the ions at the ion exit using the applied nonlinear DC voltage sequence.

22. The method of claim 21, wherein the pressure is at least 760 Torr and above.

23. The method of claim 21, further comprising directing ions focused at the ion exit to a focused ion beam target.

24. The method of claim 18, wherein the nonlinear DC voltage sequence is defined by a voltage difference between adjacent electrodes that increases nonlinearly from the ion entrance to the ion exit.

25. The method of claim 24, wherein the nonlinear DC voltage sequence comprises a first portion defining a quadratic DC voltage sequence and a second portion defining an exponential voltage sequence.

26. The method of claim 18, further comprising receiving ions at the ion exit by an ion receiver.

27. The method of claim 26, further comprising directing the received ions to an ion analyzer, wherein the ion analyzer is a mass spectrometer or an ion mobility spectrometer.

28. The method of claim 18, wherein the nonlinear DC voltage sequence comprises a quadratic sequence, an exponential sequence, a cubic sequence, and/or a polynomial sequence of order n, wherein n is an integer.

29. The method of claim 18, further comprising varying the nonlinear DC voltage sequence over time with ions in the volume.

30. The method of claim 18, further comprising injecting a drift gas into the volume with the ions in the volume.

31. The method of claim 18, further comprising applying heat to the electrode arrangement and/or the volume.

32. The method of claim 18, further comprising introducing a drift gas to the volume.

33. The method of claim 18, further comprising receiving ions at an ion exit of the electrode arrangement.

34. An apparatus, comprising:
an electrode arrangement comprising a plurality of electrodes defining a volume, an ion entrance, and an ion exit; and
a voltage source coupled to the plurality of electrodes and configured to apply an exponential DC voltage sequence to the electrodes between the ion entrance and the ion exit that directs ions through the volume of the electrode arrangement, wherein the volume is at a pressure of at least 1 Torr.

35. An apparatus, comprising:
an electrode arrangement comprising a plurality of electrodes defining a volume, an ion entrance, and an ion exit; and
a voltage source coupled to the plurality of electrodes and configured to apply a nonlinear DC voltage sequence to the electrodes between the ion entrance and the ion exit that directs ions through the volume of the electrode arrangement, wherein the volume is at a pressure of at least 1 Torr and the nonlinear DC voltage sequence includes a quadratic DC voltage sequence along a first length and an exponential DC voltage sequence along a second length adjacent to the first length.

36. An apparatus, comprising:
an electrode arrangement comprising a plurality of electrodes defining a volume, an ion entrance, and an ion exit;
a housing supporting the electrode arrangement, wherein the housing includes a gas port configured to receive a drift gas from a gas source and a heat source configured to heat the plurality of electrodes and the volume of the electrode arrangement; and
a voltage source coupled to the plurality of electrodes and configured to apply a nonlinear DC voltage sequence to the electrodes between the ion entrance and the ion exit that directs ions through the volume of the electrode arrangement, wherein the volume is at a pressure of at least 1 Torr.

37. A method, comprising:
applying a nonlinear DC voltage sequence to a plurality of electrodes of an electrode arrangement, wherein the plurality of electrodes define a volume, ion entrance, and ion exit, and the application of the nonlinear DC voltage sequence is configured to direct ions through the volume of the electrode arrangement between the ion entrance and ion exit with the volume at a pressure of at least 1 Torr, wherein the nonlinear DC voltage sequence comprises a first portion defining a quadratic DC voltage sequence and a second portion defining an exponential voltage sequence.

38. A method, comprising:
applying a nonlinear DC voltage sequence to a plurality of electrodes of an electrode arrangement, wherein the plurality of electrodes define a volume, ion entrance, and ion exit, and the application of the nonlinear DC voltage sequence is configured to direct ions through the volume of the electrode arrangement between the ion entrance and ion exit with the volume at a pressure of at least 1 Torr; and
applying heat to the electrode arrangement and/or the volume.

39. An apparatus, comprising:
an electrode arrangement comprising a plurality of electrodes defining a volume, an ion entrance, and an ion exit; and
a voltage source coupled to the plurality of electrodes and configured to apply a nonlinear DC voltage sequence to the electrodes between the ion entrance and the ion exit that directs ions through the volume of the electrode arrangement, wherein the volume is at a pressure of at least 1 Torr and a voltage difference between adjacent pairs of electrodes increases nonlinearly from the ion entrance to the ion exit.

* * * * *